(12) United States Patent
Kobayashi

(10) Patent No.: US 7,519,048 B2
(45) Date of Patent: Apr. 14, 2009

(54) COMMUNICATION SYSTEM AND PACKET SWITCHING METHOD THEREOF

(75) Inventor: Masayoshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 794 days.

(21) Appl. No.: 10/027,006

(22) Filed: Dec. 26, 2001

(65) Prior Publication Data
US 2002/0085488 A1 Jul. 4, 2002

(30) Foreign Application Priority Data
Dec. 28, 2000 (JP) ............................... 2000-401060

(51) Int. Cl.
*H04L 12/66* (2006.01)
(52) U.S. Cl. ...................................... 370/352; 709/203
(58) Field of Classification Search ................... None
See application file for complete search history.

(56) References Cited

U.S. PATENT DOCUMENTS

| | | | | |
|---|---|---|---|---|
| 5,941,988 | A * | 8/1999 | Bhagwat et al. | 726/12 |
| 6,108,329 | A * | 8/2000 | Oyama et al. | 370/352 |
| 6,598,071 | B1 * | 7/2003 | Hayashi et al. | 709/203 |
| 6,788,696 | B2 * | 9/2004 | Allan et al. | 370/411 |
| 6,857,009 | B1 * | 2/2005 | Ferreria et al. | 709/219 |
| 2002/0112085 | A1 * | 8/2002 | Berg | 709/250 |

OTHER PUBLICATIONS

Maltz et al., IBM Research Report, TCP Splicing for Application Layer Proxy Performance dated Mar. 17, 1998, IBM Research Division pp. 1-17.*
Japanese Office Action issued Aug. 23, 2004 (w/ English translation of relevant portions).
David A. Maltz, "Improving HTTP Caching Proxy Performance with TCP Tap." pp. 1-6.
Proceedings from IEEE Infocom '98 Conference on Computer Communications, vol. 3, (1998), California, pp. 1037-1045.
Saibal Kumar Adhya, "Asymmetric TCP Splice: A Kernel Mechanism to Increase the Flexibility of TCP Splice," Thesis submitted to Indian Institute of Technology, Kanpur, pp. 1-50.

* cited by examiner

*Primary Examiner*—Robert W Wilson
(74) *Attorney, Agent, or Firm*—Dickstein Shapiro LLP

(57) ABSTRACT

A switching apparatus for relaying packet communication through a communication network between a plurality of servers and clients, at the time of relaying a packet to be transmitted from the server to the client, rewrites header information of the packet in question to have the contents to be set when the packet in question is transmitted from the switching apparatus and sends the rewritten packet to the client and from the time of relaying a data acquisition request from the client until the end of transmission of a packet of an acknowledgement to be transmitted from the server to the client, conducts one-way splicing in the direction from the server in question to the client in question, as well as successively conducting retransmission control and flow control with respect to communication from the client to the server.

40 Claims, 18 Drawing Sheets

COMMUNICATION SYSTEM AND PACKET SWITCHING METHOD THEREOF

BACKGROUND OF THE INVENTION

1. Field of the Invention

The present invention relates to a communication system using packet switching and, more particularly, to a communication system which enables efficient switching of communication between a server and a client and a switching method thereof.

2. Description of the Related Art

In an OSI reference model network protocol, data communication network functions are classified roughly into seven layers which are, from the lowest-order, a physical layer, a data link layer, a network layer, a transport layer, a session layer, a presentation layer and an application layer. They are in some cases referred to as a layer 1, a layer 2 and so on in order.

Among nodes on a communication network, some are called a layer 2 switch, a layer 3 switch, and a layer 4 switch corresponding to layers of data to be referred to in communication switching. In recent years, there are provided a layer 7 switch (or a 4-7 layer switch) for minutely controlling flow and traffic based on information of a higher-order application layer.

FIG. 18 is a block diagram showing a structure of a conventional communication system having a switching apparatus 100*b* which is a layer 7 switch.

In the conventional communication system shown in FIG. 18, a server group 71 including a plurality of servers 70 and clients 60 are connected to each other by a network 50 as a packet switching network. Among packet switching networks is an IP (Internet Protocol) network.

Each client 60 is supplied with service from the servers 70 in the server group 71 through the network 50. In the service, first, the client 60 sets up a connection of a transport layer (e.g. TCP protocol) enabling bidirectional communication with the server 70 and the client 60 sends to the server 70 an identifier of data to be obtained, so that the designated data is sent from the server 70 to the client 60. With one connection, a plurality of data acquisition requests can be issued and in this case, the server 70 will sequentially send the requested data to the client 60.

When finishing obtaining the data to be obtained from a certain server 70, the client 60 sends a close request to the server 70 to instruct the server side to cut off the connection.

In the connection of the transport layer for bidirectional communication which is used in this service, a packet includes a sequence number indicative of a position of data in the transport layer contained in the packet, a data length of data of the packet at the transport layer and an Ack number for indicating, to a communication partner, a data position at the transport layer whose reception is surely finished so far. Transport layer protocol terminating units (terminating units) at the opposite ends of communication conduct retransmission control of a packet lost in the course of communication by using the sequence number and the Ack number.

The packet in some cases includes a field (window field) for indicating a remaining capacity of a reception buffer to a communication partner for the purpose of flow control at the opposite ends of communication. The value of this field will be referred to as a Win value hereinafter.

In addition, at the opposite ends of communication, an initial value of a sequence number is notified to each other by hand shaking. Moreover, at the end of a connection, the connection is cut off by sending and receiving a packet having a flag (end flag) indicative of the end of connection set-up and a packet including an acknowledgement of the reception to and from each other. One example of such protocol is the TCP protocol for use in the Internet.

Next, function and operation of the conventional switching apparatus 100*b* shown in FIG. 18 will be described in more detail.

The switching apparatus 100*b* of FIG. 18 has a function of making the client 60 virtually recognize the plurality of servers 70 in the server group 71 as one server to transfer a data acquisition request from the client 60 to an appropriate server 70 and transfer data of an acknowledgement from the server 70 to the client 60 in question.

By the client 60, the server group 71 is recognized as a virtual one server 70 (virtual server) having the same network 50 address. When the client 60 intends to connect with a virtual server having the address in question, first a connection is set up between the client 60 and the switching apparatus 100*b*.

The client 60 puts a data acquisition request (identifier of data to be obtained) onto the connection. The switching apparatus 100*b* selects the server 70 as an appropriate connection destination based on the identifier of the data acquisition request transferred through the connection.

Next, the switching apparatus 100*b* sets up a connection to the selected server 70 to transfer the data acquisition request onto the connection. The server 70 makes data whose acquisition is requested flow on the connection and the switching apparatus 100*b* transfers the data to the client 60.

At this time point, there are two connections, one between the client 60 and the switching apparatus 100*b* and the other between the switching apparatus 100*b* and the server 70 and the switching apparatus 100*b* links the connections together.

In other words, connecting the two transport layer connections between the client 60 and the switching apparatus 100*b* and between the switching apparatus 100*b* and the server 70 into one to cause the server 70 and the client 60 to conduct retransmission and flow control of the transport layers eliminates the need of the switching apparatus 100*b* for conducting retransmission and flow control regarding the connection in question.

This operation will be referred to as splicing.

In the following, detailed description will be made of processing of splicing by the switching apparatus 100*b* as a conventional layer 7 switch with reference to the attached drawings. FIG. 19 is a block diagram showing a structure of the conventional switching apparatus 100*b*.

The switching apparatus 100*b* of FIG. 19 includes a client side processing unit 10*b* for processing communication with the client side, a server side processing unit 20*b* for processing communication with the server side, an analysis unit 30*b* for determining a connection destination of each client and a storage unit 40*b* for recording a forwarding table indicative of a server as a connection destination corresponding to an individual data acquisition request from the client or the like.

The client side processing unit 10*b* includes a client side terminating unit 11*b* for terminating communication on the client side, a client side switching unit 13*b* for switching a data communication path and a client side communication unit 14*b* for transmitting and receiving packets to and from each client. The server side processing unit 20*b* includes a server side terminating unit 21*b* for terminating communication on the server side, a server side updating unit 22*b* for rewriting header information of a packet to update the same, a server side switching unit 23*b* for switching a data communication path and a server side communication unit 24*b* for transmitting and receiving packets to and from each server 70.

A packet from the client 60 to the switching apparatus 100b arrives at the client side switching unit 13b from the direction indicated by an arrow A in FIG. 19, while a packet from the switching apparatus 100b to the client 60 is delivered from the client side terminating unit 11b or the server side updating unit 22b to the client 60 following arrows B and C in FIG. 19.

On the other hand, a packet from the server side to the switching apparatus 100b arrives at the switching unit 23b from the direction indicated by an arrow E in FIG. 19, while a packet from the switching apparatus 100b to the server 70 is delivered from the server side terminating unit 21b or the server side updating unit 22b to the server 70 following an arrow D etc. in FIG. 19.

The client side switching unit 13b hands the packet arriving from the direction indicated by the arrow A over to the client side terminating unit 11b or the server side updating unit 22b by an instruction by the server side updating unit 22b. The server side switching unit 23b hands the packet arriving from the direction of the arrow E over to the server side updating unit 22b or the server side terminating unit 21b according to an instruction by the server side terminating unit 21b.

First, when the client 60 intends to connect to a virtual server, hand shaking is conducted for the establishment of a connection. A packet at this time is transmitted and received between the client 60 and the client side terminating unit 11b by an instruction to the client side switching unit 13b given by the server side updating unit 22b, thereby setting up a connection between the client 60 and the client side terminating unit 11b. Hereinafter, an initial sequence number of the client 60 and an initial sequence number of the client side processing unit 10b at this time of connection will be referred to as "SC" and "SU", respectively, and recorded.

The client 60 hands the data acquisition request (identifier of data to be obtained) over onto the connection. The client side terminating unit 11b processes the transport layer protocol to take out data flowing on the connection and hands the data acquisition request over to the analysis unit 30b.

The analysis unit 30b is capable of selecting an appropriate server 70, for example, by referring to the forwarding table stored in the storage unit 40b based on the data acquisition request or by other method. Then, the analysis unit 30b instructs the server side terminating unit 21b to set up a connection with the selected server 70, so that the server side terminating unit 21b sets up the connection with the designated server 70.

At this time, hand shaking is conducted for setting up a connection between the server side terminating unit 21b and the server 70. Here, the server side terminating unit 21b instructs the server side switching unit 23b about a proper communication path such that the server side terminating unit 21b and the server 70 can communicate a packet related to hand shaking. An initial sequence number of the server 70 and an initial sequence number of the server side terminating unit 21b at this time of connection will be referred to as "SS" and "SV", respectively, and recorded.

Next, the analysis unit 30b hands the data acquisition request over to the server side terminating unit 21b to transfer the data acquisition request to the server 70 by using the established connection. Here, the server side terminating unit 21b instructs the switching unit 23b to conduct switching such that a packet sent hereafter from the server 70 in question is handed over to the server side updating unit 22b.

Next, a packet mounted with data corresponding to the data acquisition request arrives at the switching apparatus 100b from the server 70. The packet sent from the server 70 is handed over to the server side updating unit 22b by the switching unit 23b.

The server side updating unit 22b updates header information at the time of relay of this packet. More specifically, the unit rewrites the sequence number and the Ack number of the packet, and if necessary correctly updates a check sum of the transport layer protocol, and sends the updated data to the client 60.

Updating of a sequence number and an Ack number of a packet sent hereafter from the server 70 will be conducted by rewriting data of the packet so as to be equivalent to data of a packet transmitted from the client side processing unit 10 (i.e. the switching apparatus 100b).

In a case, for example, where no other packets than that described above is transmitted from the client 60, the packet can be updated as follows.

First, as to a sequence number, add a difference between an initial sequence number "SU" of the client side terminating unit 11b which is received from the client side terminating unit 11b and an initial sequence number "SS" of the server 70 which is received from the server side terminating unit 21b. In other words, "updated sequence number=current sequence number+SU−SS". At this time, processing to be conducted when the updated sequence number exceeds a maximum value of a sequence number will be conformed to addition and subtraction methods of sequence numbers in the transport layer protocol.

As to an Ack number, add a difference between an initial sequence number "SC" of the client 60 which is received from the client side terminating unit 11b and an initial sequence number "SV" of the server side terminating unit 21 which is received from the server side terminating unit 21b. In other words, "updated Ack number=current Ack number+SC−SV".

With this arrangement, the transport layer protocol of the client 60 is allowed to process a packet from the server 70 regarding the packet as a packet from the client side processing unit 10b (i.e. from the switching apparatus 100b).

In the same manner, packets sent hereafter from the client 60 to the server 70 are handed over by the client side switching unit 13b to the server side updating unit 22b where a sequence number and an Ack number of a packet in question will be rewritten to have values equivalent to those of a packet sent from the server side processing unit 20b (i.e. the switching apparatus 100b), and the rewritten packet is sent. In other words, the packet will be rewritten to have "updated sequence number=current sequence number+SV−SC" and "updated Ack number=current Ack number+SS−SU".

Data transmission and reception between the server 70 and the client 60 hereafter can be thus realized only by the processing of rewriting a sequence number of each packet without processing at the client side terminating unit 11b and the server side terminating unit 21b which terminate the transport layer protocol.

The foregoing is connection splicing as described above.

In general, while only a small volume of data such as a data acquisition request flows from the client 60 to the server 70, a large volume of data flows from the server 70 to the client 60. In a case, for example, where accessing a web server is made by a web browser of a client, a large volume of data such as image data will be transmitted from the server 70 to the client 60.

Execution of this connection splicing enables relay of a large volume of data without complicated transport layer termination processing (retransmission and flow control etc.), thereby improving throughput.

The above-described conventional switching apparatus 100b, however, has a problem that at splicing, the switching apparatus 100*b* is not allowed to refer to a data acquisition request sent from the client 60.

Moreover, since the conventional switching apparatus 100*b* determines the server 70 corresponding to a data acquisition request sent from the client 60 to splice connections based only on the first sent request, the apparatus can not transfer a data acquisition request arriving from the client 60 after the connection splicing to an appropriate server 70 based on the request.

In addition, when data transfer from the selected server 70 to the client 60 based on the first sent data acquisition request is finished, even if other data acquisition request to the same server 70 remains, the above-described close request is sent to the server 70 to cut off the connection.

Since the connection is cut off, as to an acquisition request that the server 70 fails to process, the client 60 needs to start over with set-up of a connection (hand shaking) to again obtain the request, which results in increasing a delay in obtaining necessary data.

SUMMARY OF THE INVENTION

An object of the present invention is to eliminate the above-described shortcomings of the conventional art and provide a communication system capable of monitoring a packet such as a data acquisition request sent from a client to a server and executing corresponding termination processing even when splicing is conducted and a packet switching method thereof.

Another object of the present invention is to eliminate the above-described shortcomings of the conventional art and provide a communication system capable of referring to a packet such as a data acquisition request sent from a client to a server to realize transfer of a data acquisition request to an appropriate server 70 all the time, while as to a large volume of data transmitted from a server to the client side, achieving a throughput equivalent to that of a conventional switching apparatus by simplified termination processing using splicing executed only by rewriting header information of each packet such as a sequence number and an Ack number, and a packet switching method thereof.

A further object of the present invention is to eliminate the above-described shortcomings of the conventional art and provide a communication system enabling a delay in obtaining necessary data to be minimized by maintaining a connection set up between a client and a switching apparatus without cut off until when the client receives all the data transmitted in response to a data acquisition request from the client and a packet switching method thereof.

According to the first aspect of the invention, a communication system using packet switching for conducting packet communication between a server and a client through a switching apparatus, wherein said switching apparatus during relay of a packet to be transmitted from said server to said client, rewrites header information of the packet in question to have the contents which are to be set when the packet in question is sent from said switching apparatus and sends said packet to said client, and from the time of relay of a data acquisition request from said client until the end of transmission of a packet of an acknowledgement to be transmitted from said server to said client, conducts one-way splicing processing in the direction from the server in question to the client in question, as well as successively conducting retransmission control and flow control of communication in the direction from said client to said server.

In the preferred construction, said switching apparatus comprises a client side processing unit for accepting a connection from each said client to manage a connection with the client in question for transmitting and receiving a packet to and from the client, a server side processing unit for accessing each said server to manage a connection with the server in question for transmitting and receiving a packet to and from the server, means for, during relay of a packet to be transmitted from said server to said client, rewriting header information of said packet to send said packet rewritten to said client, and means for conducting one-way splicing in the direction from said server to the client in question, as well as successively conducting retransmission control and flow control for communication in the direction from said client to said client side processing unit and communication in the direction from said server side processing unit to said server without cutting off an established connection.

In another preferred construction, said client side processing unit includes a client side terminating unit for controlling a connection with each said client to accept a connection and a request from each said client, and a client side updating unit for rewriting header information of a packet to be transmitted from said server to said client to relay the rewritten packet, and said server side processing unit includes a server side terminating unit for managing a connection with each said server to relay an instruction and data directed to each said server which are sent from said client side terminating unit, and a server side updating unit for accepting a packet to be transmitted from each said server to each said client to send the packet to said client side updating unit.

In another preferred construction, header information of said packet includes a sequence number indicative of, in transmission data divided into individual packets, order of data in a packet in question, a data length of the packet in question, and an Ack number indicative of a sequence number of data that a communication partner has already received.

In another preferred construction, header information of said packet further includes a Win value indicative of a remaining capacity of a reception buffer that the communication partner is yet to receive.

In another preferred construction, said client side terminating unit includes means for notifying header information of a packet received from each said client to said client side updating unit and said server side terminating unit, and said server side updating unit includes means for notifying header information of a packet to be transmitted from each said server to each said client to said server side terminating unit, said client side updating unit and said server side terminating unit recording and referring to said notified header information to properly rewrite header information of the packet.

In another preferred construction, at a state where said one-way splicing processing is set, said client side terminating unit instructs said client side updating unit to conduct acknowledgment processing in response to a packet received from each said client, said client side updating unit including means for receiving an instruction of said acknowledgement processing to generate and send a packet of an acknowledgement to the client in question.

In another preferred construction, said server side updating unit relays transmission of packets from a plurality of said servers directed to one said client, and includes means for removing, from header information of a packet to be relayed, a flag indicative of the end of transmission of the packet at individual said server, thereby relaying a packet transmitted by the switching of said plurality of servers to said client without cut-off of a connection with said client.

In another preferred construction, said client side terminating unit and said server side terminating unit include means for restoring transmission data to be transmitted in individual divisional packets from said client to said server to an original state prior to the division to selectively transmit each packet to the server.

In another preferred construction, the communication system further comprises an analysis unit for determining a server as a connection destination to which each said client connects, said analysis unit including means for obtaining, from said client side terminating unit, information of a request sent by said client to each said server, means for determining a server as a connection destination to which the client in question is to connect based on said request, and means for instructing said server side terminating unit to connect the client in question with said server determined as a connection destination.

In another preferred construction, said client side terminating unit and said server side terminating unit include means for restoring transmission data to be transmitted in individual divisional packets from said client to said server to an original state prior to the division and then transmitting the restored packet to the server in question, and said analysis unit includes means for determining said server as a connection destination based on said transmission data restored to the original state prior to the division.

In another preferred construction, said analysis unit includes means for sequentially classifying data acquisition requests yet to be processed which are issued by said client into groups according to corresponding servers as connection destinations, and means for instructing, on each said classified group basis, said server side terminating unit to set up a connection to a corresponding server and execute said data acquisition requests classified into the group in question.

In another preferred construction, said analysis unit includes means for sequentially classifying data acquisition requests yet to be processed which are issued by said client into groups according to corresponding servers as connection destinations, and means for instructing, on each said classified group basis, said server side terminating unit to set up a connection to a corresponding server, execute said data acquisition requests classified into the group in question and cut off the connection with the server after the transmission of the acquisition request.

According to the second aspect of the invention, a switching apparatus for relaying packet communication through a communication network between a plurality of servers and clients, wherein said switching apparatus during relay of a packet to be transmitted from said server to said client, rewrites header information of the packet in question to have the contents which are to be set when the packet in question is sent from the switching apparatus and sends said packet to said client, and from the time of relay of a data acquisition request from said client until the end of transmission of a packet of an acknowledgement to be transmitted from said server to said client, conducts one-way splicing processing in the direction from the server in question to the client in question, as well as successively conducting retransmission control and flow control of communication in the direction from said client to said server.

In the preferred construction, the switching apparatus comprises a client side processing unit for accepting a connection from each said client to manage a connection with the client in question for transmitting and receiving a packet to and from the client, a server side processing unit for accessing each said server to manage a connection with the server in question for transmitting and receiving a packet to and from the server, means for, during relay of a packet to be transmitted from said server to said client, rewriting header information of said packet to send said packet rewritten to said client, and means for conducting one-way splicing in the direction from said server to the client in question, as well as successively conducting retransmission control and flow control for communication in the direction from said client to said client side processing unit and communication in the direction from said server side processing unit to said server without cutting off an established connection.

In another preferred construction, said client side processing unit includes a client side terminating unit for managing a connection with each said client to accept a connection and a request from each said client, and a client side updating unit for rewriting header information of a packet to be transmitted from said server to said client to relay the rewritten packet, and said server side processing unit includes a server side terminating unit for managing a connection with each said server to relay an instruction and data directed to each said server which are sent from said client side terminating unit, and a server side updating unit for accepting a packet to be transmitted from each said server to each said client to send the packet to said client side updating unit.

In another preferred construction, header information of said packet includes a sequence number indicative of, in transmission data divided into individual packets, order of data in a packet in question, a data length of the packet in question, and an Ack number indicative of a sequence number of data that a communication partner has already received.

In another preferred construction, header information of said packet further includes a Win value indicative of a remaining capacity of a reception buffer that the communication partner is yet to receive.

In another preferred construction, said client side terminating unit includes means for notifying header information of a packet received from each said client to said client side updating unit and said server side terminating unit, and said server side updating unit includes means for notifying header information of a packet to be transmitted from each said server to each said client to said server side terminating unit, said client side updating unit and said server side terminating unit recording and referring to said notified header information to properly rewrite header information of the packet.

In another preferred construction, at a state where said one-way splicing processing is set, said client side terminating unit instructs said client side updating unit to conduct acknowledgment processing in response to a packet received from each said client, said client side updating unit includes means for accepting an instruction of said acknowledgement processing to generate and send a packet of an acknowledgement to the client in question.

In another preferred construction, said server side updating unit relays transmission of packets from a plurality of said servers directed to one said client, and includes means for removing, from header information of a packet to be relayed, a flag indicative of the end of transmission of a packet at individual said server, thereby relaying a packet transmitted by the switching of said plurality of servers to said client without cut-off of a connection with said client.

In another preferred construction, said client side terminating unit and said server side terminating unit include means for restoring transmission data to be transmitted in individual divisional packets from said client to said server to an original state prior to the division to selectively transmit each packet to the server.

In another preferred construction, the switching apparatus further comprises an analysis unit for determining a server as a connection destination to which each said client connects, said analysis unit includes means for obtaining, from said client side terminating unit, information of a request sent by said client to each said server, means for determining a server as a connection destination to which the client in question is to connect based on said request, and means for instructing said server side terminating unit to connect the client in question with said server determined as a connection destination.

In another preferred construction, said client side terminating unit and said server side terminating unit include means for restoring transmission data to be transmitted in individual divisional packets from said client to said server to an original state prior to the division and then transmitting the restored packet to the server in question, and said analysis unit includes means for determining said server as a connection destination based on said transmission data restored to the original state prior to the division.

In another preferred construction, said analysis unit includes means for sequentially classifying data acquisition requests yet to be processed which are issued by said client into groups according to corresponding servers as connection destinations, and means for instructing, on each said classified group basis, said server side terminating unit to set up a connection to a corresponding server and execute said data acquisition requests classified into the group in question.

According to the third aspect of the invention, a packet switching method of a switching apparatus for relaying packet communication through a communication network between a plurality of servers and clients, comprising the steps of during relay of a packet to be transmitted from said server to said client, rewriting header information of the packet in question to have the contents which are to be set when the packet in question is sent from the switching apparatus and sending said packet to said client, and from the time of relay of a data acquisition request from said client until the end of transmission of a packet of an acknowledgement to be transmitted from said server to said client, conducting one-way splicing processing in the direction from the server in question to the client in question, as well as successively conducting retransmission control and flow control of communication in the direction from said client to said server.

In the preferred construction, the packet switching method further comprising the steps of managing a connection with each said client to accept a connection and a request from each said client, rewriting header information of a packet to be transmitted from said server to said client to relay the rewritten packet, and managing a connection with each said server to relay an instruction and data directed to each said server which are sent from said client, wherein header information of said packet includes:

a sequence number indicative of, in transmission data divided into individual packets, order of data in a packet in question, a data length in and below a transport layer of the packet in question, an Ack number indicative of a sequence number of data that a communication partner has already received, and a Win value indicative of a remaining capacity of a reception buffer that the communication partner is yet to receive.

In another preferred construction, the packet switching method further comprising the steps of relaying transmission of packets from a plurality of said servers directed to one said client, and removing, from header information of a packet to be relayed, a flag indicative of the end of transmission of a packet at individual said server, thereby relaying a packet transmitted by the switching of said plurality of servers to said client without cut-off of a connection with said client.

In another preferred construction, the packet switching method further comprising the step of restoring transmission data to be transmitted in individual divisional packets from said client to said server to an original state prior to the division to selectively transmit each packet to the server.

In another preferred construction, the packet switching method further comprising the steps of obtaining information of a request to be transmitted by said client to each said server, determining a server as a connection destination to which the client in question is to connect based on said request, and giving an instruction to connect the client in question with said server determined as a connection destination, thereby determining a server as a connection destination to which each said client is to connect.

In another preferred construction, the packet switching method further comprising the steps of sequentially classifying data acquisition requests yet to be processed which are issued by said client into groups according to corresponding servers as connection destinations, and giving an instruction, on each said classified group basis, to set up a connection to a corresponding server and execute said data acquisition requests classified into the group in question.

According to another aspect of the invention, a switching program for relaying packet communication through a communication network between a plurality of servers and clients by the control of a computer, comprising the functions of during relay of a packet to be transmitted from said server to said client, rewriting header information of the packet in question to have the contents which are to be set when the packet in question is sent from said switching apparatus and sending said packet to said client, and from the time of relay of a data acquisition request from said client until the end of transmission of a packet of an acknowledgement to be transmitted from said server to said client, conducting one-way splicing processing in the direction from the server in question to the client in question, as well as successively conducting retransmission control and flow control of communication in the direction from said client to said server.

According to another aspect of the invention, a switching program operating on a server in a communication system for conducting packet communication between a server and a client through a switching apparatus by the control of a computer on the server, comprising the function of, from the time of relay of a data acquisition request from said client by said switching apparatus until the end of transmission of a packet of an acknowledgement to be transmitted to said client, transmitting said packet to the client in question by one-way splicing.

According to another aspect of the invention, a switching program operating on a client in a communication system for conducting packet communication between a server and a client through a switching apparatus by the control of a computer on the client, comprising the function of, from the time of relay of a data acquisition request to said server by said switching apparatus until the end of transmission of a packet of an acknowledgement to be received from said server, receiving said packet from the server in question by one-way splicing.

According to a further aspect of the invention, a server in a communication system for conducting packet communication between a server and a client through a switching apparatus, wherein from the time of relay of a data acquisition request from said client by said switching apparatus until the end of transmission of a packet of an acknowledgement to be transmitted to said client, said server transmits said packet to the client in question by one-way splicing.

According to a still further aspect of the invention, a client in a communication system for conducting packet communication between a server and a client through a switching apparatus, wherein from the time of relay of a data acquisition request to said server by said switching apparatus until the end of transmission of a packet of an acknowledgement to be received from said server, said client receives said packet from the server in question by one-way splicing.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
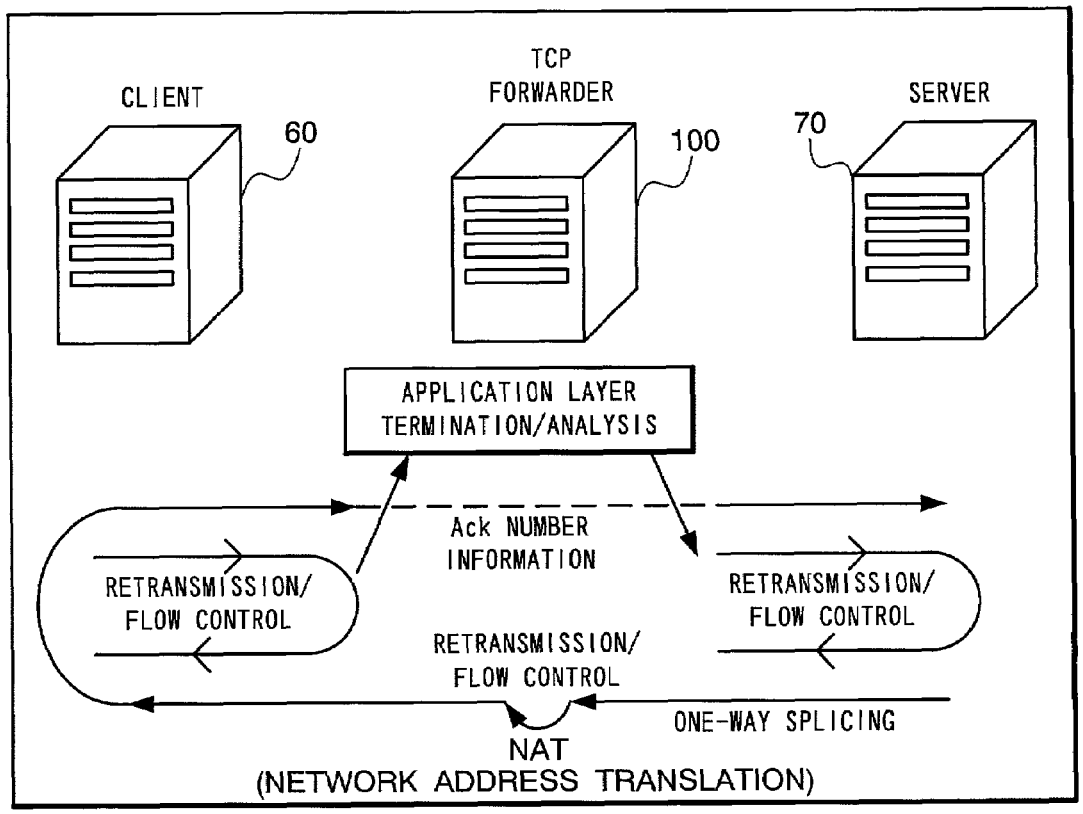
FIG. 1 is a diagram for use in explaining concept of a communication system using a one-way terminating switching apparatus of the present invention.

First, description will be made of concept of a communication system according to the present embodiment which conducts packet communication between a server and a client through a communication network with reference to FIG. 1. In FIG. 1, 100 denotes a one-way terminating switching apparatus according to the present invention which relays connections of a plurality of servers to a communication network, 60 denotes a client and 70 denotes a server.

In the present invention, splicing is conducted only for communication directed from the server 70 to the client 60 in which a large volume of data is frequently transferred, and for communication from the client 60 to the server 70, termination processing such as retransmission control and flow control is simultaneously executed.

While according to conventional techniques, two connections, one between the client 60 and the switching apparatus 100*b* and the other between the switching apparatus 100*b* and the server 70 are spliced into one connection between the client 60 and the server 70 to prevent the switching apparatus 100b from conducting termination processing such as retransmission and flow control, in the one-way terminating switching apparatus 100 of the present invention, a sequence number and an Ack number of a packet are rewritten by splicing processing with respect only to data flowing from the server 70 to the client 60 to cause the server 70 and the client 60 themselves to conduct retransmission control and flow control without making two directions between the client 60 and the server 70 into a single TCP connection.

Here, at a connection of the transport layer from the client 60 to the one-way terminating switching apparatus 100, the one-way terminating switching apparatus 100 conducts, with respect to the client 60, retransmission control and flow control of data flowing from the client 60 to the one-way terminating switching apparatus 100 to terminate. Also at a connection between the switching apparatus 100 and the server 70, the one-way terminating switching apparatus 100 conducts, with respect to the server 70, retransmission control and flow control of data flowing from the one-way terminating switching apparatus 100 to the server 70 to terminate.

Figure 2:
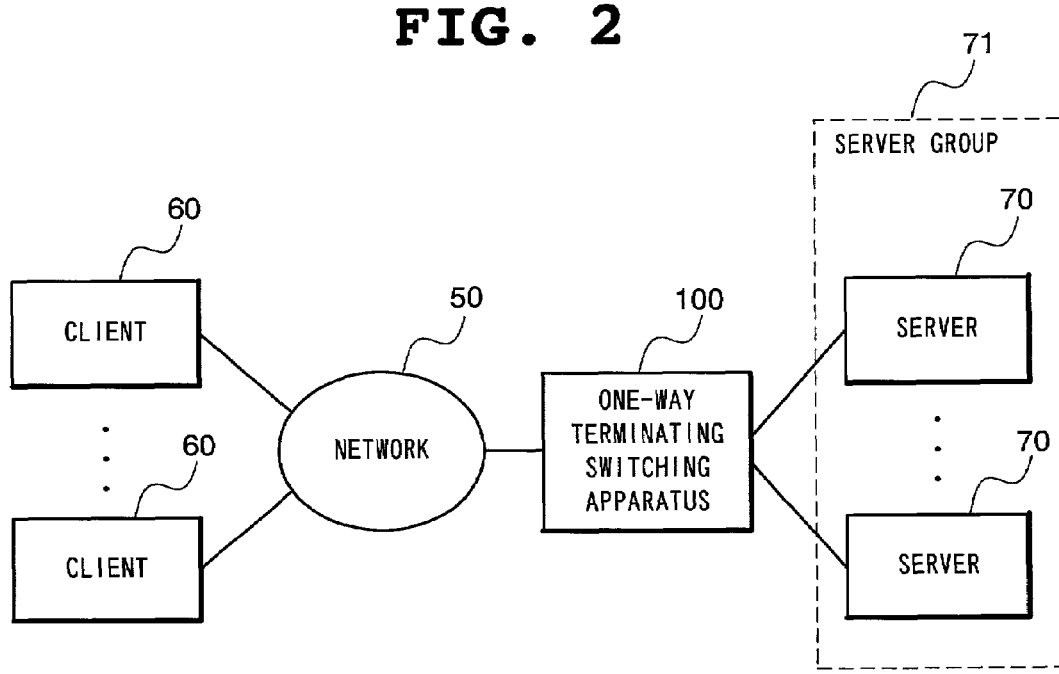
FIG. 2 is a block diagram showing one example of a network structure using a one-way terminating switching apparatus according to a first embodiment of the present invention.

FIG. 2 is a block diagram showing one example of a network structure using the one-way terminating switching apparatus 100 according to the first embodiment of the present invention.

Figure 18:
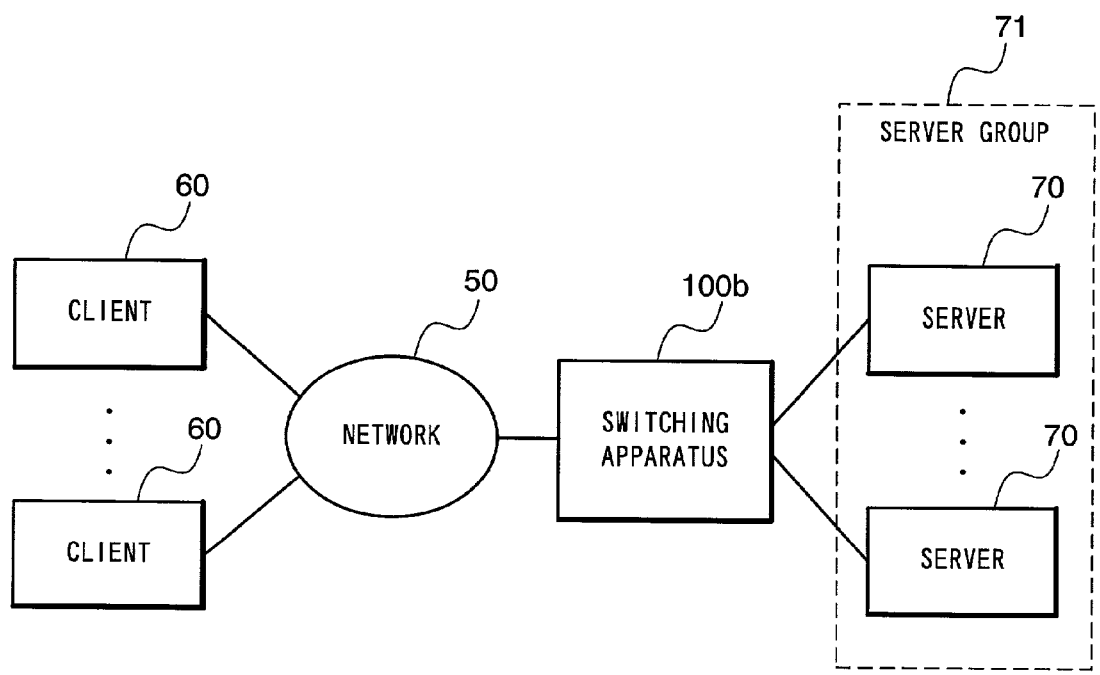
FIG. 18 is a block diagram showing a structure of a conventional communication network.
Figure 19:
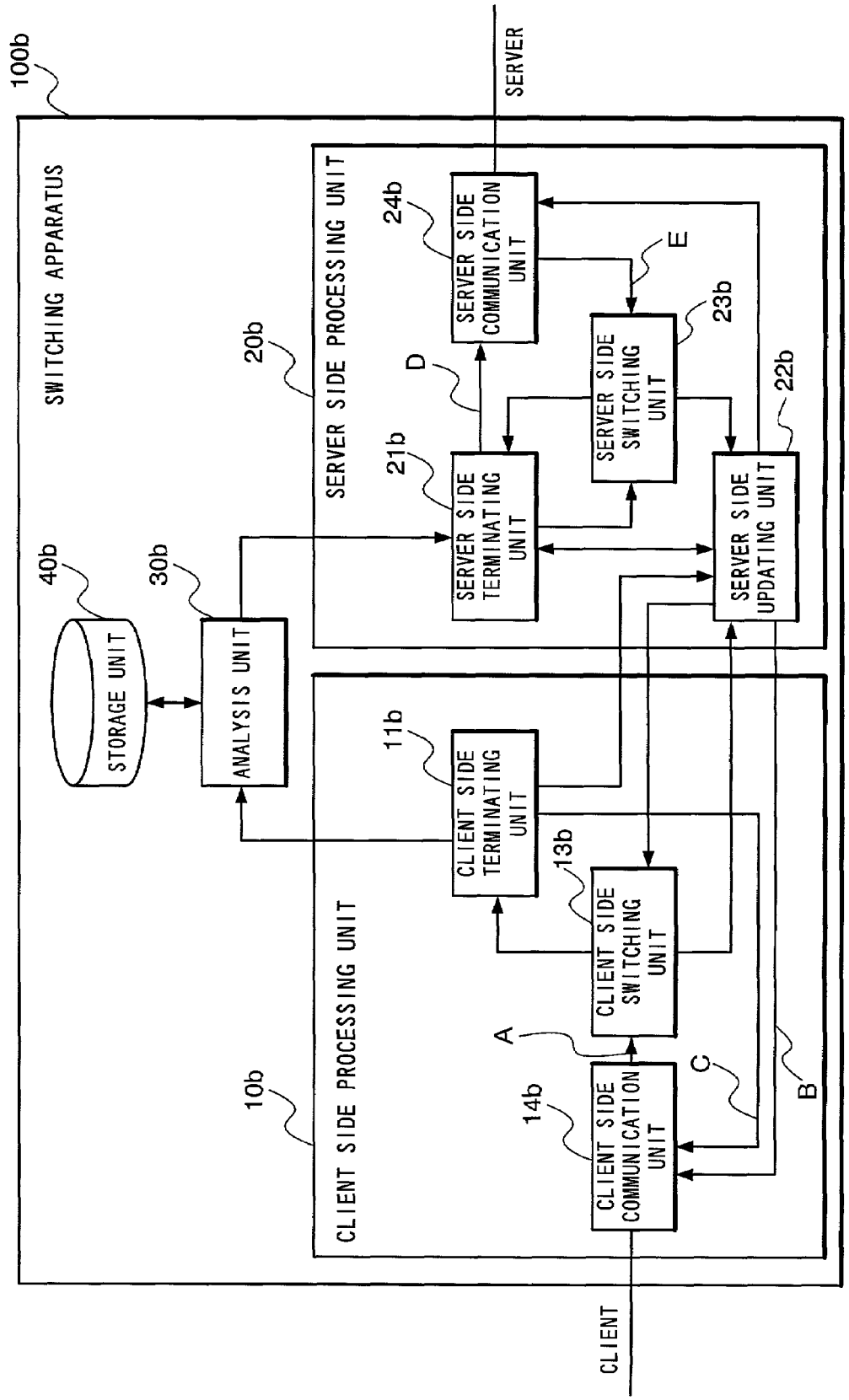
FIG. 19 is a block diagram showing a structure of a conventional layer 7 switch.

The present embodiment differs from the conventional art shown in the example of FIG. 18 in that the conventional switching apparatus 100b is replaced by the one-way terminating switching apparatus 100 for conducting splicing in one direction only.

While with the conventional switching apparatus 100b, the communication in two directions between the client 60 and the server 70 can be set at the same state, a state of terminating communication or a state of splicing at the same time, the one-way terminating switching apparatus 100 of the present embodiment conducts splicing only with respect to communication from the server 70 to the client 60 in which a large volume of data is frequently transferred and at the same time executes termination processing such as retransmission control and flow control with respect to communication from the client 60 to the server 70.

Functions of each server 70 in a server group 71 and the client 60 in FIG. 2 are the same as those of conventional techniques as described with reference to FIG. 18. Their being connected to each other by the network 50 of the packet switching network is also the same. Moreover, for the service supplied by each server 70 of the server group 71 in FIG. 2, connection is established by using a connection of the transport layer protocol as is done in the conventional art and a packet is assumed to include, as header information, a sequence number indicative of a position of data in a transport layer contained in the packet, a data length of data of the packet at the transport layer and an Ack number indicative of a data position at the transport layer whose reception is surely finished so far. Methods of setting up a connection and ending the same are assumed to be completely the same as those of the conventional techniques.

Functions of the one-way terminating switching apparatus 100 according to the present embodiment differ in a splicing method from the conventional switching apparatus 100b.

It is a conventional practice to splice two connections, one between the client 60 and the switching apparatus 100b and the other between the switching apparatus 100b and the server 70 into one connection between the client 60 and the server 70 and in this case the switching apparatus 100b is incapable of conducting termination processing such as retransmission and flow control.

The one-way terminating switching apparatus 100 of the present embodiment, on the other hand, causes the server 70 and the client 60 themselves to conduct retransmission control and flow control only by rewriting a sequence number and an Ack number of a packet as is done in conventional splicing with respect only to data flowing from the server 70 to the client 60 without making two directions between the client 60 and the server 70 into a single TCP connection.

Here, the difference from conventional techniques is that at a connection of the transport layer from the client 60 to the one-way terminating switching apparatus 100, the one-way terminating switching apparatus 100 conducts, with respect to the client 60, retransmission control and flow control of data flowing from the client 60 to the one-way terminating switching apparatus 100 to terminate. Also at a connection between the switching apparatus 100 and the server 70, the one-way terminating switching apparatus 100 conducts, with respect to the server 70, retransmission control and flow control of data flowing from the one-way terminating switching apparatus 100 to the server 70 to terminate.

In the following the splicing method of the present invention will be referred to as one-way splicing.

Figure 3:
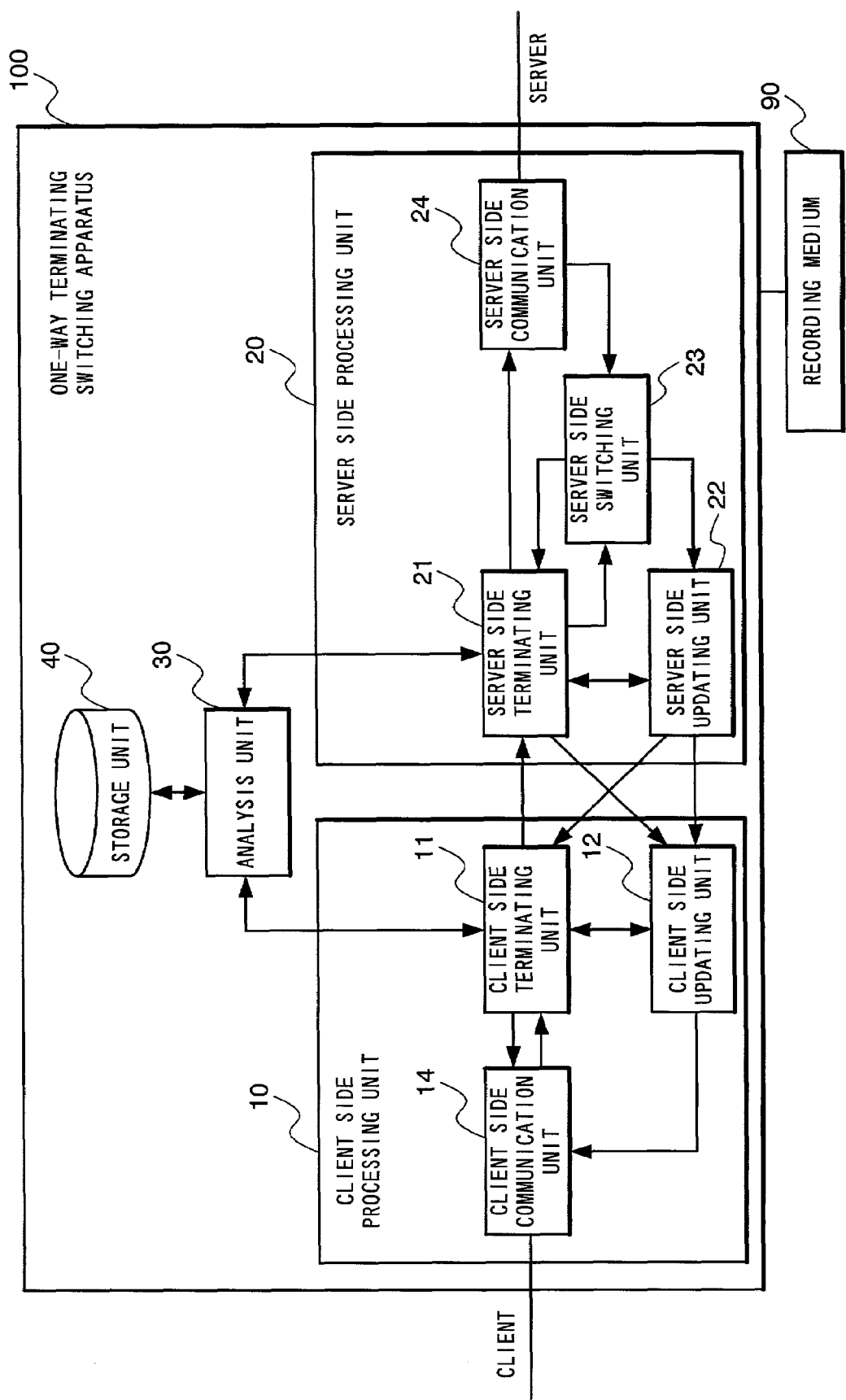
FIG. 3 is a block diagram showing a structure of the one-way terminating switching apparatus according to the first embodiment of the present invention.

FIG. 3 is a block diagram showing a structure of the one-way terminating switching apparatus 100 of the first embodiment of the present invention.

With reference to FIG. 3, the one-way terminating switching apparatus 100 of the present embodiment includes a client side processing unit 10 for processing communication with a client side, a server side processing unit 20 for processing communication with a server side, an analysis unit 30 for analyzing communication data of an application layer to determine a connection destination of each client and a storage unit 40 for recording a forwarding table or the like indicative of a server as a connection destination corresponding to an individual data acquisition request from a client.

The client side processing unit 10 includes a terminating unit 11 for terminating communication on the client side, an updating unit 12 for rewriting header information of a packet to update the same and a communication unit 14 for transmitting and receiving a packet to and from each client. The server side processing unit 20 includes a terminating unit 21 for terminating communication on the server side, an updating unit 22 for rewriting header information of a packet to update the same, a switching unit 23 for switching a data communication path and a communication unit 24 for transmitting and receiving a packet to and from each server 70.

First, functions of the respective components of the switching apparatus 100 according to the present embodiment will be outlined.

[Client Side Terminating Unit 11]

The client side terminating unit 11 sets up a connection at the transport layer with the client 60 to receive data including retransmission control and flow control at the transport layer from the client 60.

When the connection is set up, notify a Win value (a remaining capacity of a reception buffer) of the client 60 to the server side terminating unit 21.

At the state of one-way splicing, as to an acknowledgement (Ack) to reception of a packet from the client 60, the client side terminating unit 11 is not responsible but notifies an Ack number and a Win value for flow control to the client side updating unit 12 and asks the same to transmit an acknowledgement. Also at the state of one-way splicing, upon receiving data from the client 60, the unit 11 transfers an Ack number and a Win value of the packet from the client 60 to the server side terminating unit 21 to ask the same to transmit an acknowledgement to the server 70. The unit 11 also replies to an inquiry about current Ack number and Win value from the client side updating unit 12.

Transition to the one-way splicing state is notified of by the server side updating unit 22.

Moreover, when a packet with an end flag indicative of a connection cut-off request arrives from the client 60, conduct cut-off processing of the transport layer with respect to a connection directed from the client 60 to the client side processing unit 10 out of the two-way connections between the client 60 and the client side processing unit 10. In this case, further notify the server side terminating unit 21 that the connection directed from the client 60 to the client side processing unit 10 is cut off.

As to a connection directed from the client side processing unit 10 to the client 60, because the server side updating unit 22 notifies the unit 11 of a final sequence number of data in a packet having an end flag which arrives from the server 70, the unit 11 updates the final sequence number "F" to "updated F=F−SS+SU". In a case where the same Ack number arrives hereafter, recognize by the arrival that the connection is cut off (i.e. recognizing that a packet having an end flag has been transmitted and an acknowledgement packet thereto has arrived) to conduct cut-off processing of the transport layer of the connection directed from the client side processing unit 10 to the client 60. Here, "SS" denotes an initial sequence number of the server 70 and "SU" denotes an initial sequence number of the client side processing unit 10 which will be described in detail later.

[Client Side Updating Unit 12]

The unit 12 receives a packet to be transmitted from the server 70 to the client 60 from the server side updating unit 22, rewrites header information of the packet such as a sequence number, an Ack number and a Win value and transmits the updated packet to the client 60.

The sequence number is rewritten as "sequence number: =sequence number of packet−SS+SU". Here, "SS" denotes an initial sequence number (of the server 70) of a connection between the server side processing unit 20 and the server 70. "SU" denotes an initial sequence number (of the client side processing unit 10) of a connection between the client side processing unit 10 and the client 60. These values are obtained from the client side terminating unit 11 and the server side terminating unit 21, respectively.

As to addition and subtraction of a sequence number, processing to be conducted when the result exceeds a maximum value of the sequence number or falls short of a minimum value of the same is assumed to be conformed to addition and subtraction of sequence numbers in the transport protocol in question.

The Ack number and the Win value are respectively rewritten to latest Ack number and Win value to be returned when the current latest packet is transmitted from the client side processing unit 10 to the client 60. These latest Ack number and Win value can be obtained from the client side terminating unit 11.

When necessary, a check sum of the transport layer protocol is properly updated.

Also when receiving, from the client side terminating unit 11, a transmission request of an acknowledgement to the client 60, generate an acknowledgement packet with the Ack number and Win value rewritten as mentioned above and using a most lately used sequence number and transmit the generated packet.

To the client side updating unit 12, packets to be sent from the server 70 to the client 60 are sequentially transmitted from the server side updating unit 22, and the unit 12 sequentially records rewritten values of the sequence numbers of the received packets. The above-mentioned most lately used sequence number represents the latest sequence number after rewriting. As to an initial value of the sequence number, since a packet arrives from the server side updating unit 22 upon entering the one-way splicing state, a rewritten sequence number of the packet is assumed to be an initial value.

As to an acknowledgement packet to the client 60 whose transmission is asked for by the client side terminating unit 11, it is also possible to keep the transmission waiting a little and unify the packet with a packet from the server side updating unit 22 to transmit them as one packet.

[Analysis Unit 30]

The unit 30 obtains information of a data acquisition request (or requests) transmitted from the client 60 from the client side terminating unit 11, terminates an application layer and analyzes the information to determine the server 70 as an appropriate connection destination. Connection destination can be determined, for example, by searching a table prepared in advance for recording, corresponding to each individual data requested by the client 60, a name of the server 70 which provides the relevant data (hereinafter the table will be referred to as forwarding table) or other method.

Upon determining the server 70 as the connection destination, hand the data acquisition request and the name of the server 70 as the connection destination over to the server side terminating unit 21 to instruct on connection.

[Storage Unit 40]

The unit stores information necessary for the analysis unit 30 to select an appropriate server 70. Recording, for example, the above-described forwarding table in the storage unit 40 enables a name of an appropriate server 70 to be returned in response to a search request from the analysis unit 30.

[Server Side Terminating Unit 21]

According to a name of the server 70 as a connection destination which is designated by the analysis unit 30, the unit 21 sets up a connection of the transport layer with the server 70 as the connection destination.

When the connection is set up, register a Win value (remainder of the reception buffer) notified by the client side terminating unit 11 as an initial value of the Win value of the server side processing unit 20 and uses the value.

When the connection with the server 70 is set up, in advance instruct the switching unit 23 to switch a connection such that the server side terminating unit 21 can receive a packet sent from the server 70.

Upon set-up of the connection, the server side terminating unit 21 sends a data acquisition request to the server 70 using the set up transport layer connection. Subsequently, instruct the switching unit 23 such that packets regarding the connection which are sent from the server 70 can be hereafter received by the server side updating unit 22. Thereafter, the apparatus enters the one-way splicing state.

Also hereafter, the unit 21 will be sequentially notified of an Ack number and a Win value of a packet sent from the server 70 by the server side updating unit 22 and using these values, conducts retransmission control and flow control of data (data acquisition request and the like) of the transport layer to be sent to the server 70.

Moreover, the client 60 hereafter sequentially transmits packets of acknowledgement of reception of the relevant packet and the client side terminating unit 11 receives them to sequentially notify the server side terminating unit 21 of an Ack number and a Win value of each packet. The server side terminating unit 21 updates the notified Ack number to be "Ack number:=Ack number notified by the client side terminating unit 11−SU+SS" and uses the notified Win value to generate a packet of acknowledgement of reception of the packet in question to be sent to the server 70 and transmits the generated packet to the server 70.

Here, "SU" denotes an initial sequence number of the client side processing unit 10 at a connection between the client 60 and the client side processing unit 10 and "SS" denotes an initial sequence number of the server 70 side at a connection between the server side processing unit 20 and the server 70. The "SU" value is notified by the client side terminating unit 11.

As to addition and subtraction of sequence numbers, processing to be conducted when the result exceeds a maximum value of the sequence number or falls short of a minimum value is assumed to be conformed to addition and subtraction of sequence numbers of the transport protocol in question.

Moreover, when a connection cut-off request is issued from the client 60, the client side terminating unit 11 receives the request and notifies the server side terminating unit 21 of the same. The server side terminating unit 21 conducts cut-off processing assuming that out of the two-way connections between the client 60 and the server 70, the connection directed from the server side processing unit 20 to the server 70 is cut off (a packet with an end flag has been sent to the server 70). In this case, the cut-off processing of the connection directed from the client 60 to the client side processing unit 10 is conducted by the client side terminating unit 11.

As to the connection directed from the server 70 to the client 60, the server side terminating unit 21, upon receiving, from the server side updating unit 22, a notification of a final sequence number of data in a packet having an end flag which arrives from the server 70, updates the final sequence number "F" to "updated F=F−SS+SU" and stores the updated number. If the same Ack number as the updated final sequence number arrives, conduct cut-off processing of the transport layer of the connection directed from the server 70 to the client 60 through the switching apparatus 100 assuming that the connection is cut off (that the packet with an end flag and its corresponding Ack packet have arrived).

[Server Side Updating Unit 22]

The server side updating unit 22 accepts, from the server 70, a packet to be transmitted from the server 70 to the client 60 and sends the same to the client side updating unit 12. Every time the server side updating unit 22 receives a packet from the server 70, the unit notifies an Ack number and a Win value of the packet to the server side terminating unit 21.

In a case where a length of transport layer data of the received packet is "0", abandon the packet without sending the same to the client side updating unit 12. When the data length is not "0", hand the packet over to the client side updating unit 12.

At the first reception of a packet whose data length is not "0" after the set-up of the connection in question, hand the packet over to the client side updating unit 12, as well as instructing the client side terminating unit 11 to start one-way splicing.

On the other hand, when receiving a packet with an end flag from the server 70, hand the final sequence number "F" of the data in the packet over to the server side terminating unit 21 and the client side terminating unit 11.

Next, description will be made of operation of each component of the switching apparatus 100 according to the present embodiment.

Figure 4:
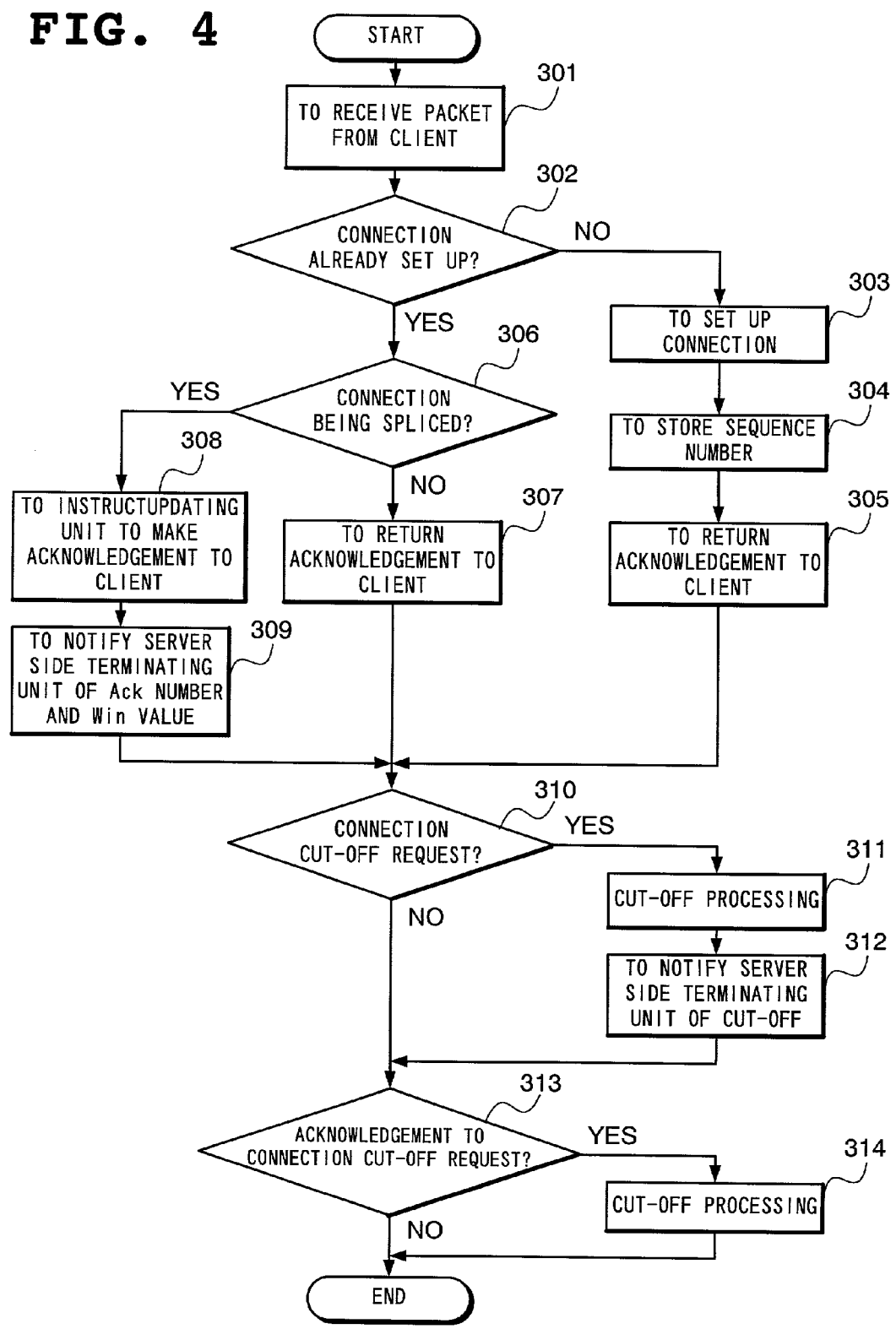
FIG. 4 is a flow chart for use in explaining operation of a client side terminating unit according to the first embodiment of the present invention.

FIG. 4 is a flow chart for use in explaining operation of the client side terminating unit 11 according to the present embodiment.

With reference to FIG. 4, the client side terminating unit 11 first receives a packet from the client 60 (Step 301) and if the packet is one of a series of packets related to connection set-up (Step 302), sets up a connection in the transport layer with the client 60 (Step 303) to store an initial sequence number "SC" of the client 60 and an initial sequence number "SU" of the client side processing unit 10 (Step 304), returns an acknowledgement to the client 60, and receives data including retransmission control and flow control at the transport layer from the client 60 (Step 305).

After the connection set-up until entering the one-way splicing state which will be described later (Step 306), return an acknowledgement to the client 60 to receive data including retransmission control and flow control at the transport layer from the client 60 (Step 307). To the server side terminating unit 21, transfer a Win value of the client 60 side as of that time.

When entering the one-way splicing state (Step 306), a data reception acknowledgement is hereafter not made by the client side terminating unit 11 but made by notifying an Ack number and a Win value for flow control to the client side updating unit 12 and asking the unit 12 for transmitting an acknowledgement (Step 308). On the other hand, at the one-way splicing state, upon receiving data from the client 60, hand an Ack number and a Win value of the packet from the client 60 over to the server side terminating unit 21 and ask the unit 21 to transmit an acknowledgement to the server 70 (Step 309). Also reply to an inquiry about current Ack number and Win value from the client side updating unit 12. The shift to the one-way splicing state is notified by the server side updating unit 22.

When a packet with an end flag indicative of a connection cut-off request arrives from the client 60 (Step 310), conduct transport layer cut-off processing assuming that out of the two-way connections between the client 60 and the client side processing unit 10, a connection directed from the client 60 to the client side processing unit 10 is cut off (Step 311). Furthermore, notify the server side terminating unit 21 that the connection directed from the client 60 to the client side processing unit 10 is cut off (Step 312).

As to a connection directed from the client side processing unit 10 to the client 60, since a final sequence number of data in a packet with an end flag which arrives from the server 70 is notified by the server side updating unit 22, update the final sequence number "F" to "updated F=F−SS+SU" and store the updated number.

When the same Ack number as the final sequence number arrives, conduct transport layer cut-off processing assuming that the connection is cut off (that a packet with an end flag has been transmitted and the corresponding Ack packet has arrived) (Steps 313 and 314).

Figure 5:
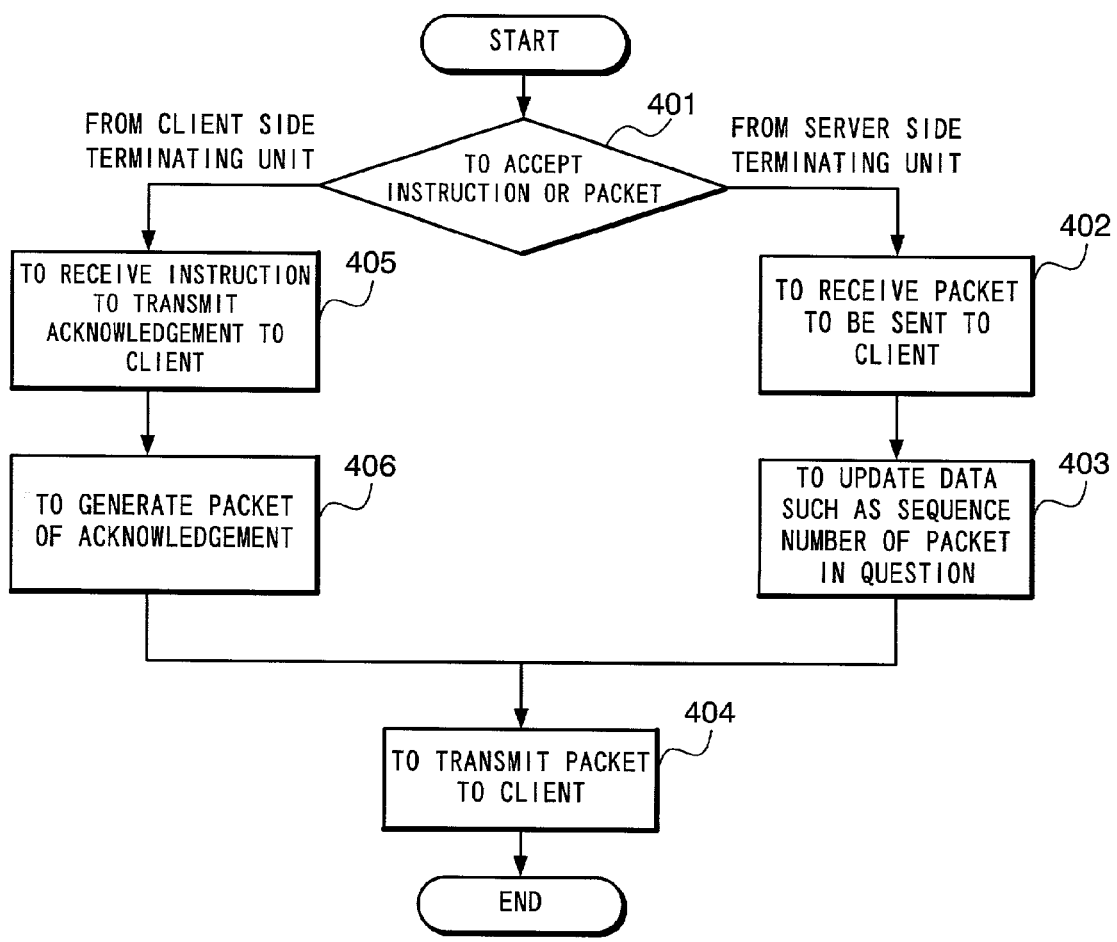
FIG. 5 is a flow chart for use in explaining operation of a client side updating unit according to the first embodiment of the present invention.

FIG. 5 is a flow chart for use in explaining operation of the client side updating unit 12 according to the present embodiment.

With reference to FIG. 5, the client side updating unit 12 of the present embodiment first accepts an instruction from the client side terminating unit 11 and a packet from the server side updating unit (Step 401). When receiving, from the server side updating unit 22, a packet to be transmitted to the client 60 (Step 402), rewrite a sequence number, an Ack number, a Win value and the like of the packet (Step 403) and transmit the updated packet to the client 60 (Step 404). Method of rewriting a sequence number, an Ack number and a Win value here is as described above.

When receiving, from the client side terminating unit 11, a request for the transmission of an acknowledgement to the client (Step 405), generate a packet of an acknowledgement with the Ack number and the Win value rewritten as described above and using a most lately used sequence number (Step 406) and transmit the generated packet to the client 60 (Step 404). This acknowledgement packet generation method is also as described above.

Another possible method of transmission of an acknowledgement to the client 60 which is asked for by the client side termination unit 11 is keeping the transmission waited for a little until receiving, from the server side updating unit 22, a packet to be sent by the server 70 to the client 60 and unifying the packets to transmit them as one packet.

Figure 6:
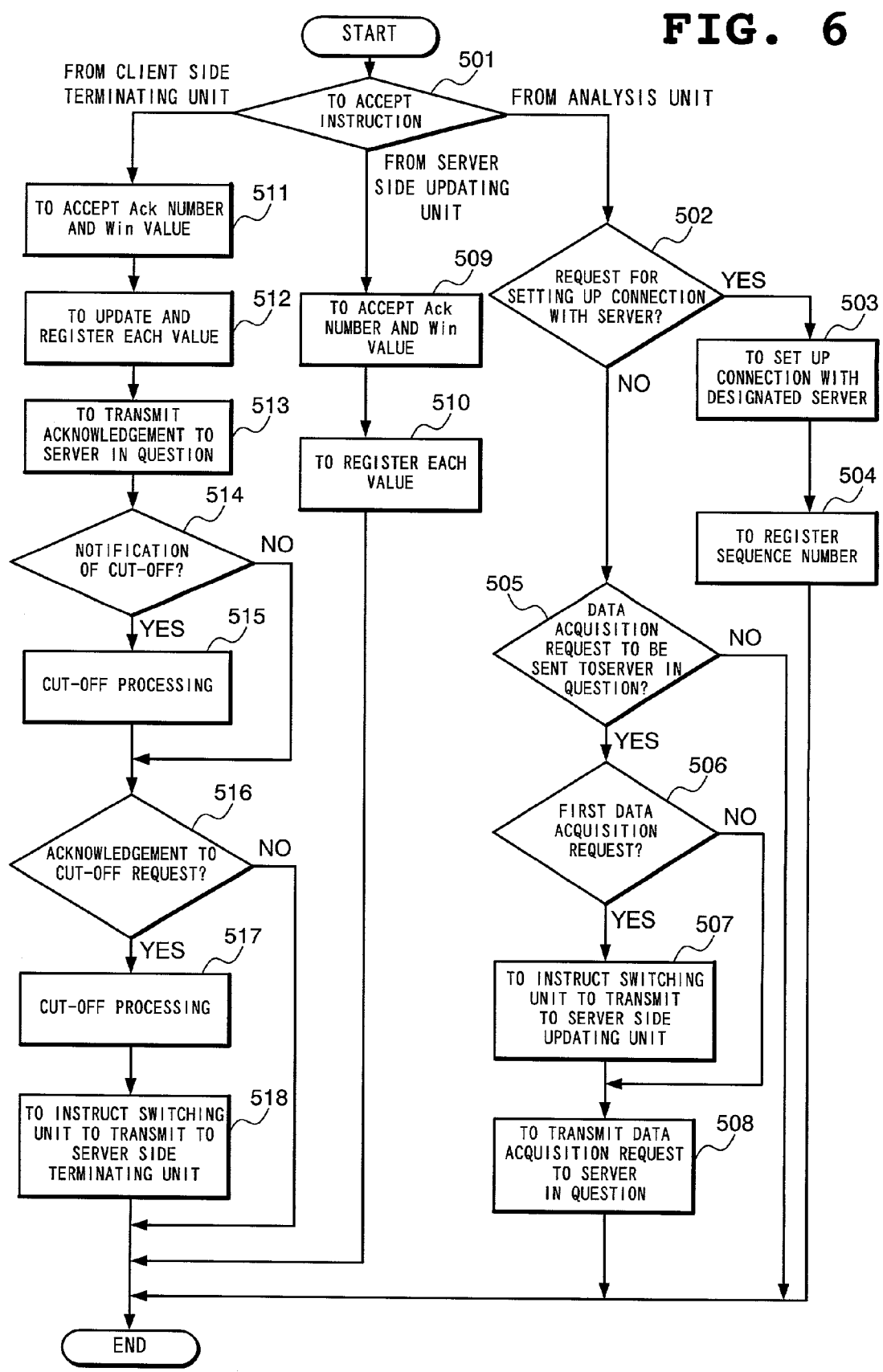
FIG. 6 is a flow chart for use in explaining operation of a server side terminating unit according to the first embodiment of the present invention.

FIG. 6 is a flow chart for use in explaining operation of the server side terminating unit 21 of the present embodiment.

With reference to FIG. 6, the server side terminating unit 21 of the present embodiment first receives transmission of an instruction from the analysis unit 30, an Ack number and a Win value from the server side updating unit 22 and the client side terminating unit 11 (Step 501).

If a request for connection set-up is issued from the analysis unit 30 (Step 502), set up a connection of the transport layer with the server 70 as a connection destination designated by the analysis unit 30 (Step 503) to record initial sequence numbers SV and SS (Step 504). At this time of connection set-up, instruct the switching unit 23 in advance such that a packet arriving from the server 70 is received by the server side terminating unit 21.

In a case where a packet sent from the client 60 when the connection is already set up is a data acquisition request to be transmitted to the server 70 (Step 505), send the data acquisition request to the server 70 using the already set up transport layer connection, while in a case where the packet is a first data acquisition request to be sent to the server 70 after the connection set-up (Step 506), instruct the switching unit 23 to conduct switching such that packets from the server 70 related to the connection in question will be received hereafter by the server side updating unit 22 (Step 507). Then, using the set up transport layer connection, send the data acquisition request to the server 70 (Step 508).

When notified by the server side updating unit 22 of an Ack number and a Win value of the packet received from the server 70 at Step 501 (Step 509), register each of these values for using retransmission control, flow control, etc. related to data (data acquisition request etc.) of the transport layer to be sent to the server 70 (Step 510).

When notified of an Ack number and a Win value by the client side terminating unit 11 at Step 501 (Step 511), update the values in a manner as described above to determine an Ack number and a Win value of the data of the transport layer to be sent to the server 70 and generate a packet (Step 512) and then transmit a packet of an acknowledgement to the server 70 (Step 513), as well as updating the Ack number and the Win value of the data of the transport layer to be sent to the server 70 to have these determined values.

Furthermore, when notified of cut-off of the connection in question by the client side terminating unit 11 (Step 514), conduct cut-off processing of the transport layer assuming that out of the two-way connections between the server side processing unit 20 and the server 70, the connection directed from the server side processing unit 20 to the server 70 is cut off (that a packet with an end flag has been sent to the server 70) (Step 515).

As to the connection directed from the server side processing unit 20 to the client 60, since a final sequence number of data in a packet with an end flag arriving from the server 70 is notified by the server side updating unit 22, update the final sequence number "F" in a manner as described above and if the same Ack number as the updated final sequence number arrives (Step 516), conduct cut-off processing of the transport layer of the connection directed from the server side processing unit 20 to the client 60 assuming that the connection is cut off (that a packet with an end flag and its corresponding Ack packet have arrived) (Step 517). Also instruct the switching unit 23 to send packets of the connection in question to the server side terminating unit 21 hereafter (Step 514).

Figure 7:
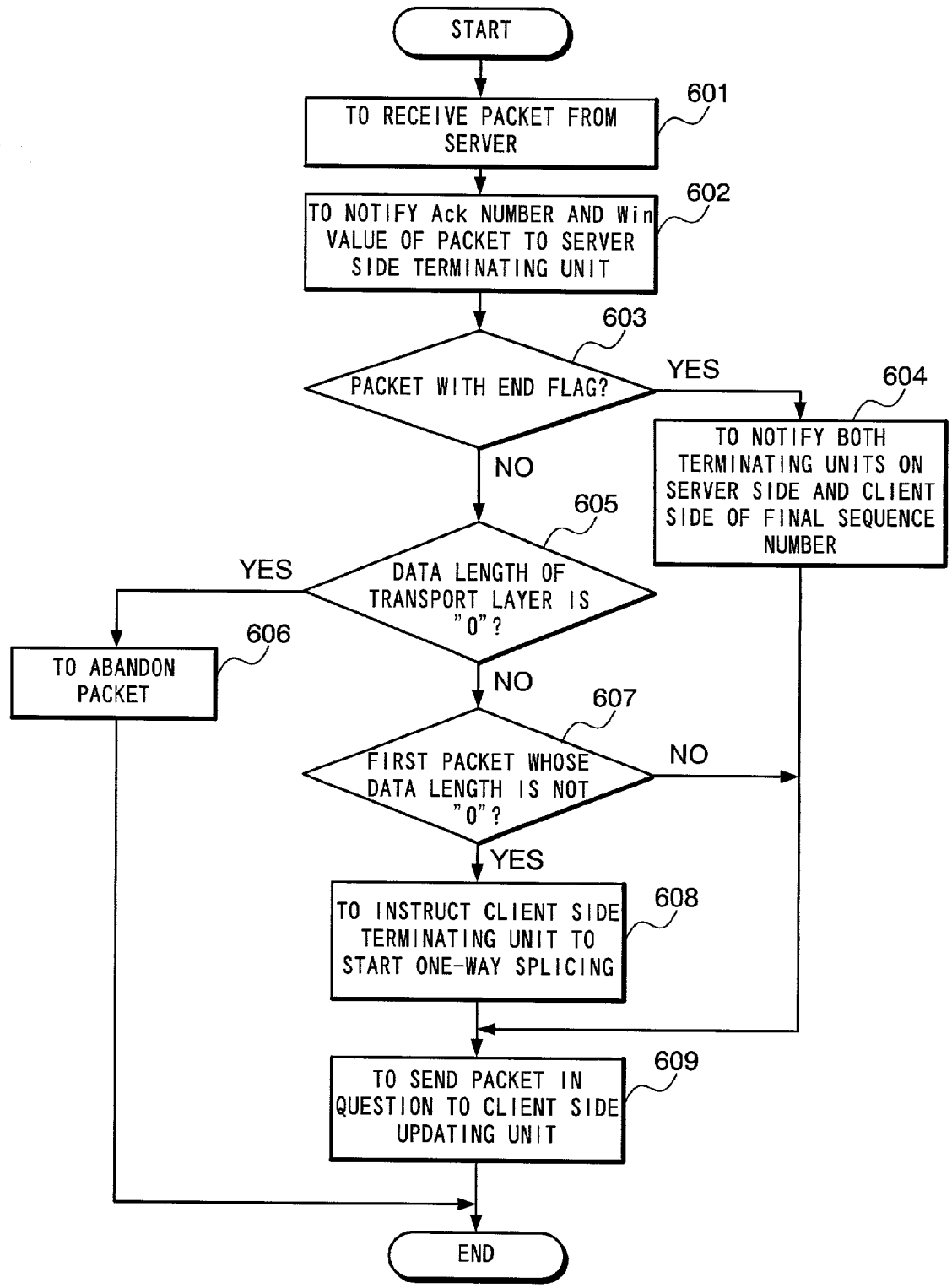
FIG. 7 is a flow chart for use in explaining operation of a server side updating unit according to the first embodiment of the present invention.

FIG. 7 is a flow chart for use in explaining operation of the server side updating unit 22 according to the present embodiment.

First, the server side updating unit 22 sequentially receives, from the server 70, packets to be sent from the server 70 to the client 60 (Step 601) to notify the server side terminating unit 21 of Ack numbers and Win values written in the packets (Step 602).

When a packet with an end flag arrives from the server 70 (Step 603), hand a final sequence number "F" of data in the packet over to the server side terminating unit 21 and the client side terminating unit 11 (Step 604) and hand the packet to the client side updating unit 12 without change (Step 609).

When receiving a packet without an end flag at Step 603, in a case where a transport layer data length of the packet is "0" (Step 605), abandon the packet (Step 606).

In a case where the data length is not "0" (Step 605), the unit 22 hands the packet over to the client side updating unit 12 (Step 609), and when handing a first packet whose data length is not "0" in the connection in question over to the client side updating unit 12 (Step 607), gives a one-way splicing start instruction to the client side terminating unit 11 at the same time (Step 608).

Figure 8:
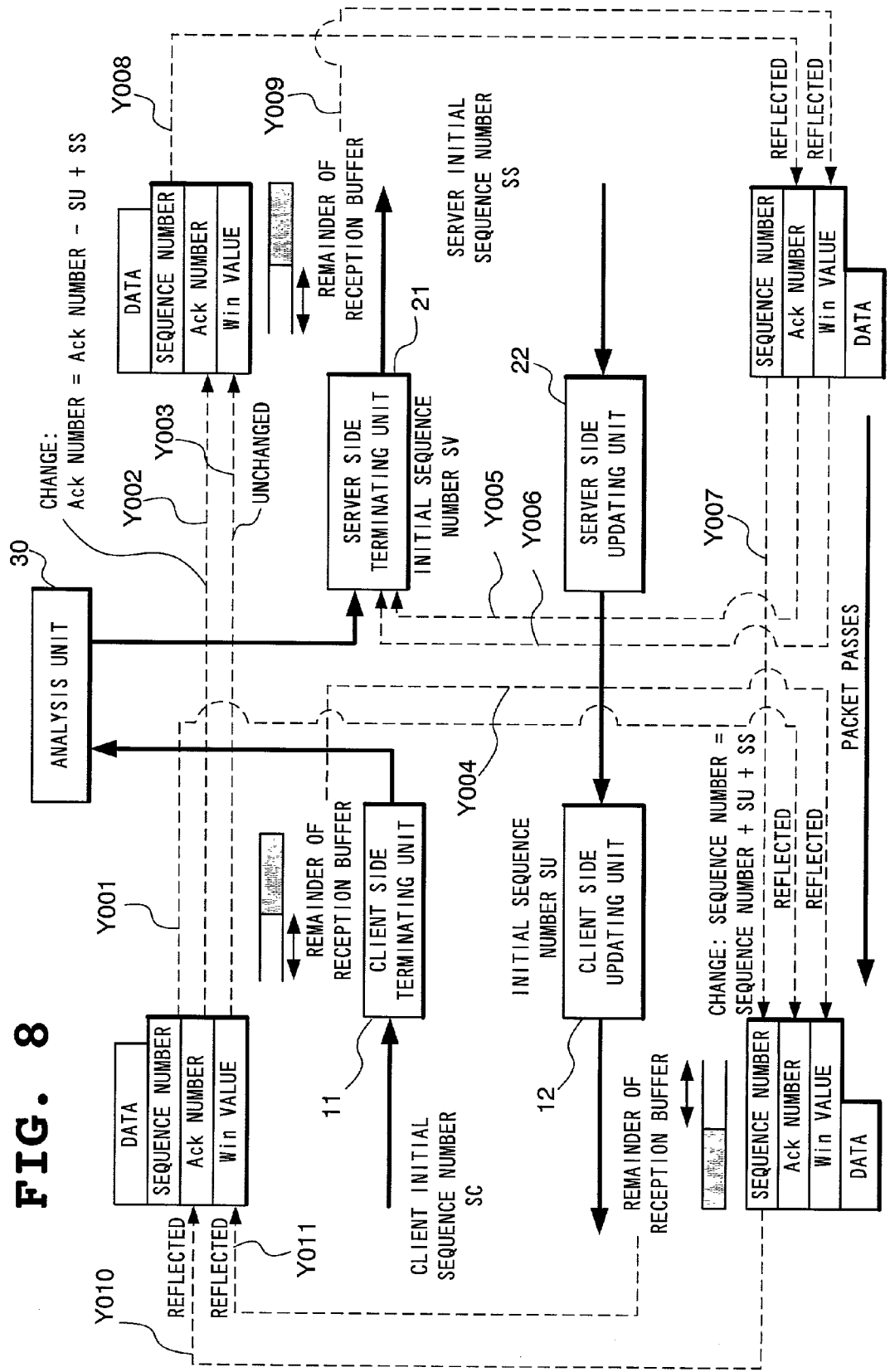
FIG. 8 is a diagram for use in explaining a flow of data in the one-way terminating switching apparatus according to the first embodiment of the present invention.

FIG. 8 is a diagram for use in explaining a data flow in the one-way terminating switching apparatus 100 according to the present embodiment, which shows while one-way splicing operation is conducted, how a sequence number, an Ack number, a Win value, transmission data, etc. are sent and received among the client 60, the server 70, the client side terminating unit 11, the server side terminating unit 21, the client side updating unit 12, the server side updating unit 22 and the like.

Shown in the following in order are flows of data transmission from the client 60 to the client side terminating unit 11 and an acknowledgement thereto, data transmission from the server side terminating unit 21 to the server 70 and an acknowledgement thereto and data transmission from the server 70 to the client 60 and an acknowledgement thereto and that a Win value indicative of a remainder of the reception buffer is properly processed.

[From Client 60 to Client Side Terminating Unit 11]

A sequence number of data from the client 60 is subjected to transport layer protocol processing at the client side terminating unit 11 and then as shown at Step 308 in the flow chart of FIG. 4 (corresponding to Y001 in FIG. 8), reflected as an Ack number of an acknowledgement packet to be transmitted from the client side updating unit 12 to the client 60.

A remainder of the reception buffer of the client side terminating unit 11 is also similarly reflected as a Win value of a packet to be transmitted from the client side updating unit 12 to the client 60 and used for appropriate retransmission control and flow control as shown at Step 309 in the flow chart of FIG. 4 (corresponding to Y004 in FIG. 8).

[From Server Side Terminating Unit 21 to Server 70]

As to data from the server side terminating unit 21 to the server 70, a sequence number is subjected to processing at a transport layer protocol terminating unit in the server 70 and as shown at Y008, reflected as an Ack number of a packet to the server side updating unit 22. This will be reflected as an Ack number of a packet to be transmitted from the client side updating unit 12 to the client 60 as shown at Step 602 in the flow chart of FIG. 7 and Step 510 in the flow chart of FIG. 6 (corresponding to Y005 in FIG. 8).

The remainder of the reception buffer of the server 70 should be also similarly reflected as an Ack number of a packet to the server side updating unit 22 as shown in Y009 of FIG. 8, which will be reflected as a Win value of a packet to be transmitted from the client side updating unit 12 to the client 60 as shown at Step 602 in the flow chart of FIG. 7 (corresponding to Y006 in FIG. 8). Thus, retransmission control and flow control are properly conducted.

[From Server 70 to Client 60]

As to data from the server 70 to the client 60, a sequence number received from the server 70 is rewritten as if the data were transmitted from the client side terminating unit 11 and the rewritten data is transmitted to the client side as shown at Step 403 (corresponding to Y007 in FIG. 8) in FIG. 5 which is an operation flow chart of the client side updating unit 12.

On the other hand, as to an Ack number and a Win value returned from the client 60 (corresponding to Y010 and Y011 in FIG. 8), the Ack number is updated as if it were an Ack number generated by the server side terminating unit 21 and returned to the server 70 (corresponding to Y002 in FIG. 8) as shown at Step 512 in the flow chart of FIG. 6, while the Win value is returned to the server 70 as shown at Step 512 in the flow chart of FIG. 6 (corresponding to Y003 in FIG. 8), whereby retransmission control and flow control are properly conducted between the server 70 and the client 60.

In addition, the client side terminating unit 11 and the server side terminating unit 21 of the present embodiment also allows a method of restoring data, which is to be transmitted from the client 60 to the server 70 after being divided into individual packets, to an original state prior to division and then transmitting the restored data to the server in question.

As described in the foregoing, the switching apparatus 100 of the present embodiment enables termination of a transport layer by conducting, with respect to the client 60 and the server 70, retransmission control and flow control of data of the transport layer flowing from the client 60 to the one-way terminating switching apparatus 100 and that flowing from the one-way terminating switching apparatus 100 to the server 70, as well as enabling high-speed relaying of packets only by rewriting a sequence number and an Ack number of a packet with respect to data flowing from the server 70 to the client 60 similarly to conventional splicing without conducting retransmission control and flow control. Moreover, at the one-way splicing state, as to data directed from the server 70 to the client 60, retransmission control, flow control, etc. are conducted by the server 70 and the client 60 themselves.

The switching apparatus 100 of the present embodiment thus realizes one-way splicing communication.

Figure 9:
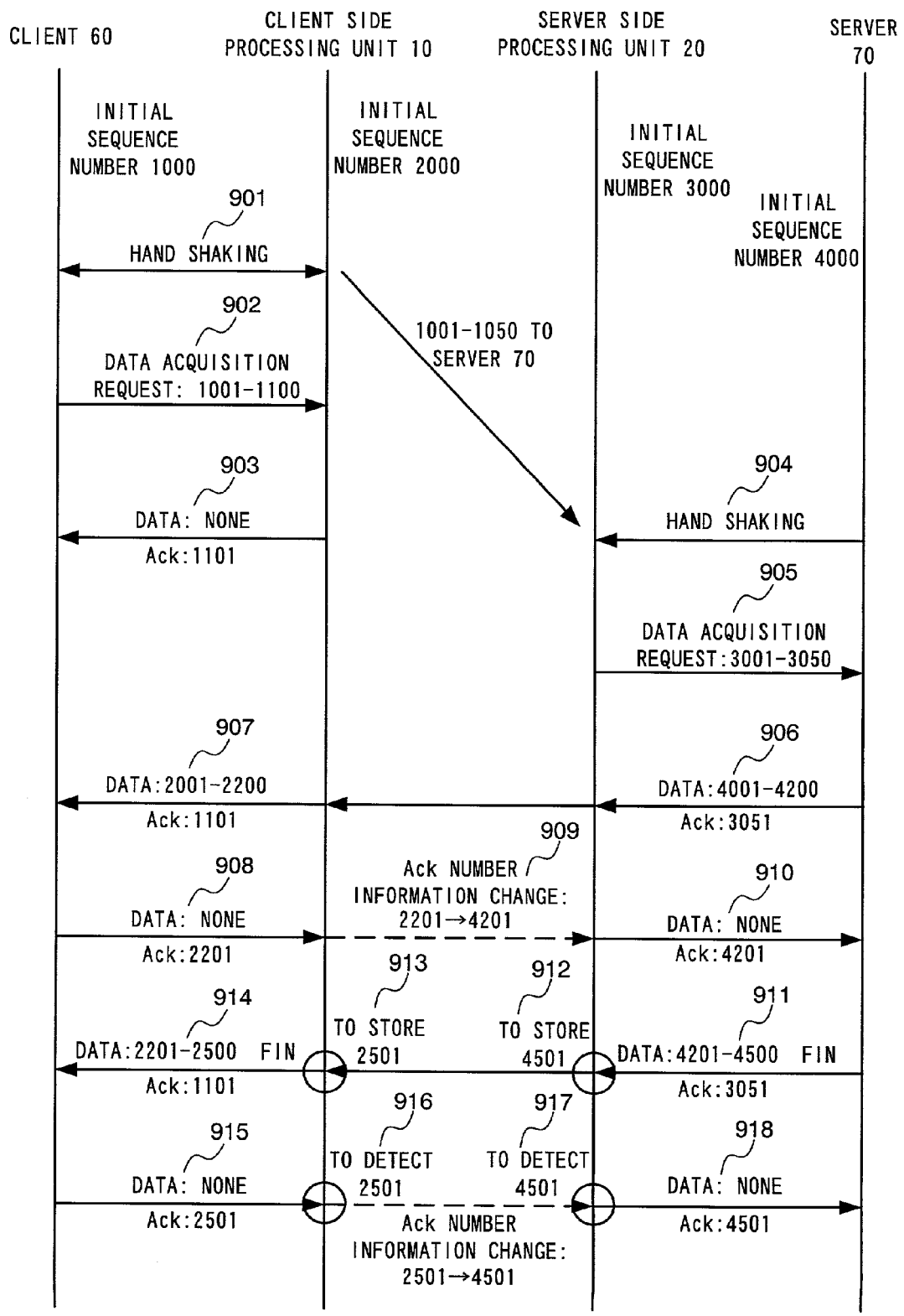
FIG. 9 is a timing chart for use in explaining a specific operation example of the first embodiment of the present invention.

Next, description will be made of a specific operation example at thus structured communication system according to the first embodiment with reference to the timing chart of FIG. 9. FIG. 9 shows a time series of sequence numbers and Ack numbers according to the first embodiment.

Hand shaking is conducted between the client 60 and the client side processing unit 10. Here, it is assumed that an initial sequence number of data on the side of the client 60 is "1000" and an initial sequence number of the client side processing unit 10 is "2000" (901).

From the client 60, data mounted with data acquisition requests is transmitted to the client side processing unit 10. At this time, the sequence numbers of the data acquisition requests are assumed to be "1001" through "1100" (902).

The client side processing unit 10 returns "1101" as an Ack number corresponding to the data acquisition request to the client 60 (903).

The analysis unit 30 determines that among the received data acquisition requests (a plurality of acquisition requests are included), some of the requests received at the beginning should be transmitted to the server 70 and sets up a connection with the server 70. Assume that an initial sequence number of the server side processing unit 20 is "3000" and that of the server 70 is "4000" (904).

To the server 70, send a data acquisition request to be transmitted (905).

Part (sequence numbers "4001" through "4200") of data related to the requests is returned to the client 60 (906).

With the sequence numbers and the Ack number rewritten, the requested data is delivered to the client 60. By the number change, the sequence numbers are rewritten into "2001" through "2200" and the Ack number is rewritten into "1101" (907).

From the client 60, a packet with an Ack number indicative of the reception of data up to the sequence number "2200" is sent (908).

Having its number changed, this Ack number information is delivered to the server side processing unit 20 (909).

At the server side processing unit 20, a packet mounted with the changed Ack number is transmitted to the server 70 (910).

Last data (sequence numbers "4201" through "4500") corresponding to the requests is sent from the server 70 to the client 60. This packet has a FIN flag setting up (911).

The Ack number "4501" corresponding to the last sequence number of the packet is stored in the server side processing unit 20 (912).

At the client side processing unit 10, the number "2501" obtained by changing the Ack number corresponding to the last sequence number of the packet is stored (913).

The requested data with the sequence numbers and the Ack number rewritten is delivered to the client 60. As a result of the number change, the sequence numbers are rewritten into "2201" through "2500" and the Ack number is also rewritten into "1101". The client 60 receives this packet to start end processing (914).

From the client 60, the Ack number "2501" is returned (915).

Upon confirming the Ack number to find that it is coincident with the stored number "2501", the client side processing unit 10 finds that the client 60 receives the last data corresponding to the requests from the server 70 and conducts end processing (916).

Upon finding that the number "4501" obtained by changing the Ack number of the packet coincides with the stored number, the server 70 finds that the client 60 receives the last data corresponding to the requests from the server 70 to conduct end processing (917).

Packet mounted with the changed Ack number is returned to the server 70 (918).

Next, a second embodiment of the present invention will be described.

Figure 10:
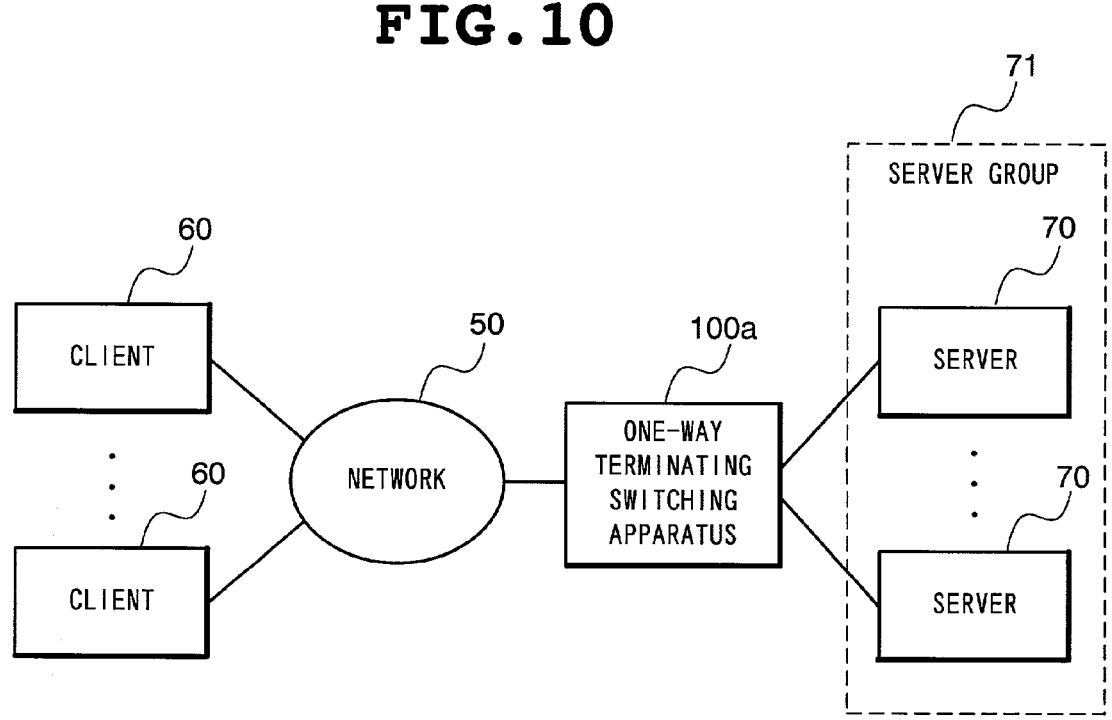
FIG. 10 is a block diagram showing one example of a network structure using a one-way terminating switching apparatus according to a second embodiment of the present invention.
Figure 11:
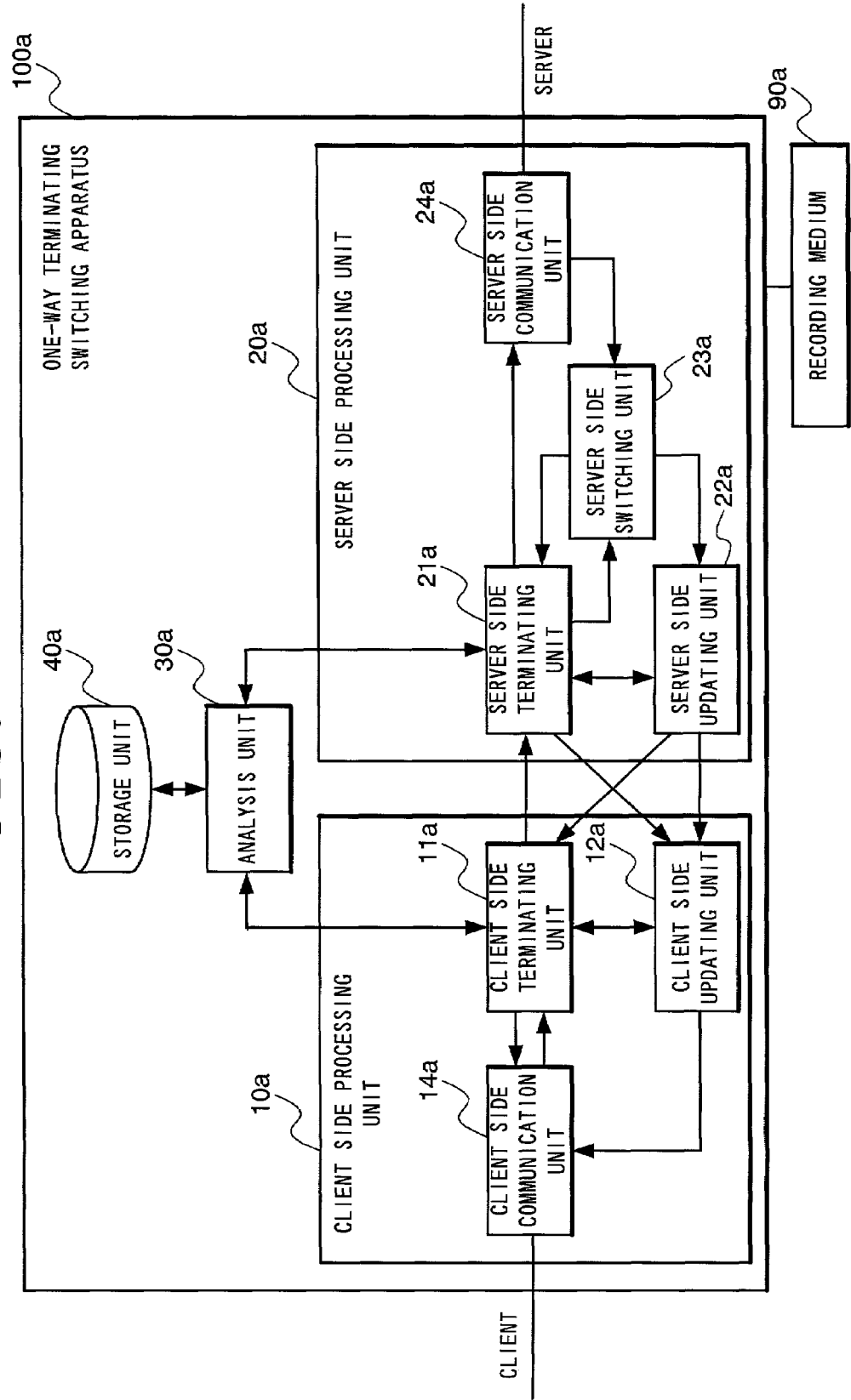
FIG. 11 is a block diagram showing a structure of the one-way terminating switching apparatus according to the second embodiment of the present invention.

FIG. 10 is a block diagram showing one example of a network structure using a one-way terminating switching apparatus 100*a* according to a second embodiment of the present invention, while FIG. 11 is a block diagram showing a structure of the one-way terminating switching apparatus 100*a* of the present embodiment.

These are the same as those of the first embodiment shown in FIGS. 2 and 3 above, with the only difference from the first embodiment being operation of a client side terminating unit 11*a*, a client side updating unit 12*a*, an analysis unit 30*a*, a server side terminating unit 21*a* and a server side updating unit 22*a*.

Description will be first made of these components.

[Client Side Terminating Unit 11*a*]

Differences from the client side terminating unit 11 of the first embodiment are that the unit 11*a* is capable of cutting off a transport layer connection between the client 60 and the client side terminating unit 11*a* (by sending a packet with an end flag) in response to an instruction from the analysis unit 30 and that it receives no value of a final sequence number "F" from the server side updating unit 22*a*. The remaining operation is the same as that of the first embodiment.

More specifically, the client side terminating unit 11*a* of the present embodiment sets up a connection at the transport layer with the client 60 to receive data including retransmission control and flow control at the transport layer from the client 60.

At a state of one-way splicing which will be described later, an acknowledgement of data reception is not made by the client side terminating unit 11*a* but by informing the client side updating unit 12*a* of an Ack number and a Win value for flow control to ask for transmission of an acknowledgement.

Also at the one-way splicing state, upon receiving data from the client 60, transfer an Ack number and a Win value of the packet from the client 60 to the server side terminating unit 21*a* to ask for transmission of an acknowledgement to the server 70. Also replay to an inquiry about current Ack number and Win value from the client side updating unit 12*a*. Shift to the one-way splicing state is notified by the server side updating unit 22*a*.

Moreover, when a packet with an end flag indicative of a connection cut-off request arrives from the client 60, conduct cut-off processing of the transport layer with respect to a connection directed from the client 60 to the client side processing unit 10*a*. Also notify the server side terminating unit 21*a* that the connection directed from the client 60 to the client side processing unit 10*a* is cut off.

As to a connection directed from the client side processing unit 10*a* to the client 60, conduct cut-off processing of the transport layer of the connection according to an instruction from the analysis unit 30*a*.

[Client Side Updating Unit 12*a*]

The difference in operation from the client side updating unit 12 of the one-way terminating switching apparatus 100 according to the first embodiment is that because an initial sequence number of a connection of the server 70 for use in rewriting a sequence number varies with a change of the server 70 targeted by the server side terminating unit 21*a*, a sequence number is rewritten into "sequence number:=sequence number of packet−SS+SU" by using a value of a current connection.

Here, "SS" denotes an initial sequence number of a current connection of the server side terminating unit 21*a* with the server 70, value of which number is obtained from the server side terminating unit 21*a*.

"SU" of the present embodiment denotes an initial sequence number of a connection of the client side processing unit 10*a* with the client 60 or "a final sequence number of a packet including an end flag from an immediately preceding server 70 plus one". The value of "SU" is received from the client side terminating unit 11*a* when SU denotes an initial sequence number and received from the server side updating unit 22*a* when it is "a final sequence number of a packet including an end flag from an immediately preceding server 70 plus one".

As to addition and subtraction of a sequence number, processing to be conducted when the result exceeds a maximum value of the sequence number or falls short of a minimum value is assumed to be conformed to addition and subtraction of sequence numbers of the transport protocol in question.

[Analysis Unit 30*a*]

The analysis unit 30*a* obtains data from the client side terminating unit 11*a* to terminate an application layer and analyzes a data acquisition request (or a plurality of requests at a time) from the client 60 to determine an appropriate server 70.

In a case where to a plurality of data acquisition requests, different servers 70 correspond, the plurality of data acquisition requests are sequentially grouped by their corresponding servers 70 on a first-come-first-served basis.

In a case, for example, where ten acquisition requests R1 through R10 are issued in which R1 and R2 correspond to a first server, R3 to R5 to a second server and R6 to R10 to the first server in order, they are sequentially grouped in this order such as R1 and R2 as a first group, R3 to R5 as a second group and R6 to R10 as a third group.

In this example of grouping, although the servers 70 corresponding to the first and third groups are the same first server, the acquisition requests are divided into different groups because of sequential grouping on a first-come-first-served basis.

For each group, the analysis unit 30*a* hands a name of its server 70 and acquisition requests over to the server side terminating unit 21*a*.

As to the last acquisition request of one group, the analysis unit 30*a* applies to the server 70 a close request for cutting off a connection by the server side when transmission of the data in question is completed. In a case where the group is the last (where no further group yet to be processed remains), it is also effective not to add a close request because during the processing of the group, an additional data acquisition request might be further issued from the client 60.

On the other hand, in a case where responding to an additional data acquisition request from the client 60 creates the need of switching the server 70, hand a data acquisition request with a close request added over to the server side terminating unit 21 or hand the data acquisition request as it is to the server side terminating unit 21. Moreover, when switching the server 70 by the first additional request here, make a connection cut-off request to the server side terminating unit 21*a*. When processing of a certain group is completed, the completion is notified by the server side terminating unit 21*a* and then the analysis unit 30*a* gives an instruction on the processing of a next group.

The analysis unit 30*a* repeats the present processing every time it receives data from the client side terminating unit 11*a*.

As to a data acquisition request received by the analysis unit 30*a* from the client 60, there is a case where a close request is added lastly. In this case, store a group of data acquisition requests in question as a group to be cut off and after finishing processing of the group in question, instruct the client side terminating unit 11*a* to cut off the connection with the client 60.

[Server Side Terminating Unit 21*a*]

The differences from the server side terminating unit 21 of the first embodiment are that data acquisition requests handed over from the analysis unit 30*a* are grouped in the present embodiment, so that the respective groups are processed in order to cut off a connection with the server 70 on a group basis (which is realized by, when a close request is added to the last acquisition request of each group which is handed from the analysis unit 30*a* simultaneously with a connection cut-off request, the transfer of the requests by the server side terminating unit 21a to the server 70, and when no close request is added, realized by expressly issuing a connection cut-off request after the last acquisition request of each group is transmitted from the server side terminating unit 21a to the server 70), that to a new group, a connection is newly set up with a server 70 designated for the group to transfer the group of data acquisition requests to the server 70, and that an initial sequence number of a server varying with every connection set-up is used for the determination of an Ack number of data of the transport layer to be sent to the server 70. A further difference is that when receiving an Ack packet corresponding to an updated final sequence number "F", the unit 21a notifies the analysis unit 30a to that effect. The remaining processing is the same as that of the first embodiment.

More specifically, the processing is as follows.

The server side terminating unit 21a receives one group of data acquisition requests and a name of the server 70 from the analysis unit 30a. Then, according to the name of the server 70, set up a connection of the transport layer with the server 70.

For use as an initial value of a Win value at the time of first connection set-up is a Win value notified from the client side terminating unit 11a and thereafter, an initial value of a Win value stored at the end of a previous connection (when receiving an acknowledgement packet having the same Ack number as an updated final sequence number "F" which will be described later).

At the time of the connection set-up, instruct the switching unit 23a to conduct switching such that the server side terminating unit 21a can receive a packet transmitted from the server 70 in response to this data acquisition request.

Upon set-up of the connection, using the set-up transport layer connection, send the group of the data acquisition requests to the server 70. To the last acquisition request, a close request is added.

At the same time, instruct the switching unit 23a to cause a packet related to the connection in question which arrives from the server 70 hereafter to arrive at the server side updating unit 22a.

Hereafter, an Ack number and a Win value of a packet received from the server 70 will be notified by the server side updating unit 22a and using these values, conduct retransmission control and flow control with respect to data (data acquisition request etc.) of the transport layer to be sent to the server 70.

Also hereafter, an Ack number and a Win value are notified by the client side terminating unit 11a, and rewriting to update the Ack number to "Ack number: Ack number notified by the client side terminating unit 11a−SU+SS" and using the Win value as it is, generate an acknowledgement packet and transmit the same to the server 70.

Here, "SU" denotes an initial sequence number of the client side processing 10a at a connection between the client 60 and the client side processing unit 10a, while "SS" denotes an initial sequence number of the server side at a connection between the server side processing unit 20a and the current server 70 or "a final sequence number of a packet having an end flag from the immediately preceding server 70 plus one". An initial sequence number of the client side terminating unit 11a as "SU" is notified by the client side terminating unit 11a.

As to addition and subtraction of a sequence number, processing to be conducted when the result exceeds a maximum value of the sequence number or falls short of a minimum value is assumed to be conformed to addition and subtraction of sequence numbers of the transport protocol in question.

Moreover, when notified of cut-off of the connection in question by the client side terminating unit 11a, assuming that a connection directed from the server side processing unit 20a to the server 70 is cut off out of the two-way connections between the server side processing unit 20a and the server 70 (that a packet with an end flag has been sent to the server 70), conduct cut-off processing.

As to a connection directed from the server side processing unit 20a to the client 60, because the server side updating unit 22a notifies a final sequence number of data in a packet with an end flag which arrives from the server 70, update the final sequence number "F" into "updated F=F−SS+SU" and if the same Ack number as the updated final sequence number arrives, assuming that the connection is cut off (that a packet with an end flag and an Ack packet corresponding thereto have arrived), conduct cut-off processing of the transport layer at the connection directed from the server 70 to the client 60 through the switching apparatus 100a. Then, notify the analysis unit 30a that processing of the group in question is completed. In addition, store a Win value as of that time.

Upon receiving a connection cut-off request from the analysis unit 30a, instruct the switching unit 23a to transmit packets related to the connection in question to the server side terminating unit 21a hereafter and cut off the connection and when the cutoff is completed, notify the analysis unit 30a to that effect.

[Server Side Updating Unit 22a]

The difference from the server side updating unit 22 of the first embodiment is that when a packet coming from the server 70 side has an end flag setting up, processing for eliminating the end flag is involved and processing of handing a value of a final sequence number "F" over to the client side terminating unit 11a is not required.

More specifically, the processing is as follows.

The server side updating unit 22a notifies, with respect to a packet received from the server 70, an Ack number and a Win value written in the packet to the server side terminating unit 21a. When a length of transport layer data of the packet is "0", abandon the packet.

On the other hand, when the data length is not "0", hand the packet over to the client side updating unit 12a. When transferring a first packet whose data length is not "0" at the connection in question to the client side updating unit 12a, give an instruction to start one-way splicing to the client side terminating unit 11a at the same time.

When a packet with an end flag arrives from the server 70, pull down the end flag and hand a final sequence number "F" of data in the packet over to the server side terminating unit 21a.

Next, processing of each unit of the present embodiment will be described.

Figure 12:
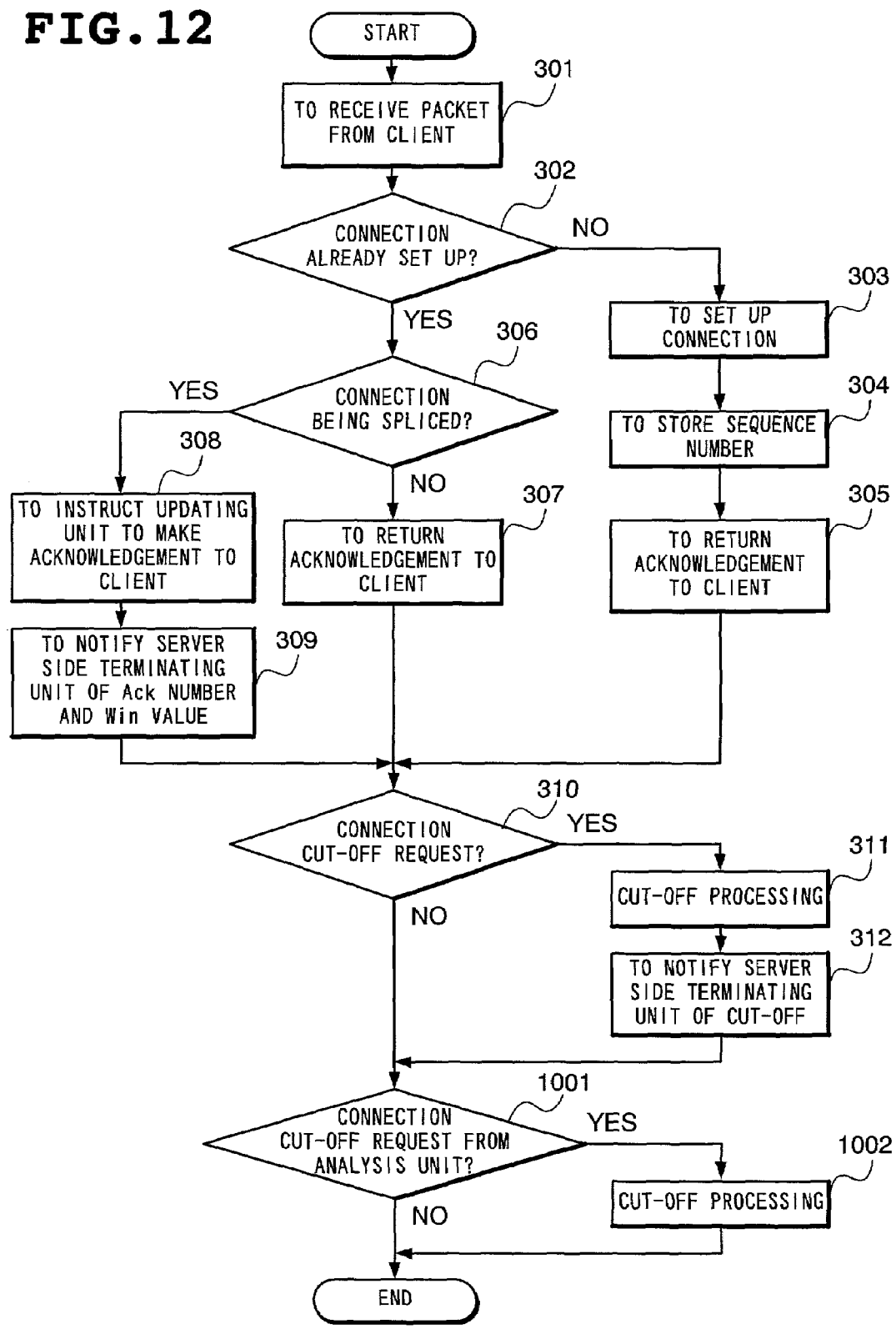
FIG. 12 is a flow chart for use in explaining operation of a client side terminating unit according to the second embodiment of the present invention.

FIG. 12 is a flow chart for use in explaining operation of the client side terminating unit 11a of the present embodiment.

Operation of the client side terminating unit 11a of the present embodiment is the same in Steps 301 to 312 as the first embodiment shown in FIG. 4.

The difference of the operation of the client side terminating unit 11a according to the present embodiment from that of the first embodiment is its capability of accepting a connection cut-off request from the analysis unit 30a, whereby upon accepting a connection cut-off request from the analysis unit 30a (Step 1001), the client side terminating unit 11a cuts off a connection directed from the client side processing unit 10a to the client 60 (Step 1002).

Flow chart of operation of the client side updating unit 12a according to the present embodiment is the same as that of the first embodiment shown in FIG. 5.

Figure 13:
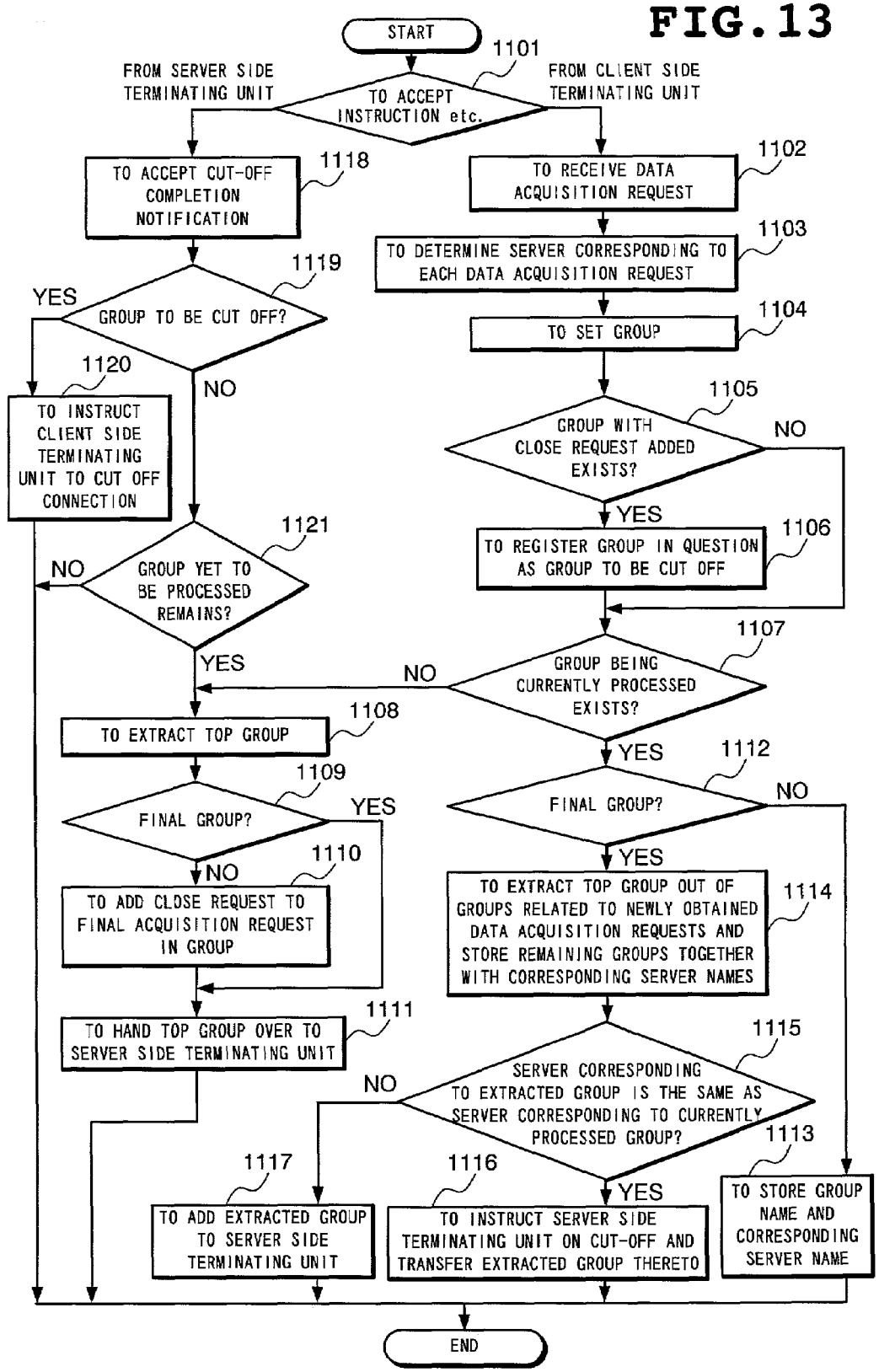
FIG. 13 is a flow chart for use in explaining operation of an analysis unit according to the second embodiment of the present invention.

FIG. 13 is a flow chart for use in explaining operation of the analysis unit 30a of the present embodiment.

With reference to FIG. 13, the analysis unit 30a of the present embodiment first accepts an instruction and the like from the client side terminating unit 11a and the server side terminating unit 21a, respectively.

When receiving a data acquisition request from the client side terminating unit 11a (Step 1102), terminate an application layer and analyze a data acquisition request (or a plurality of requests) from the client 60 to determine the server 70 as an appropriate connection destination (Step 1103). Then, hand the data acquisition request and a name of the server 70 over to the server side terminating unit 21a.

In a case where to a plurality of data acquisition requests, different servers 70 correspond, the data acquisition requests are grouped by their corresponding servers (Step 1104). Possible grouping methods include that of grouping a plurality of data acquisition requests sequentially according to their corresponding servers 70 on a first-come-first-served basis.

According to this method, in a case, for example, where ten acquisition requests R1 through R10 are issued in which R1 and R2 correspond to a first server, R3 to R5 to a second server and R6 to R10 to the first server in order, they are sequentially grouped in this order such as R1 and R2 as a first group, R3 to R5 as a second group and R6 to R10 as a third group. In this example of grouping, although the servers 70 corresponding to the first and third groups are the same first server, the acquisition requests are divided into different groups because of sequential grouping on a first-come-first-served basis.

In a case where a data acquisition request arriving from the client 60 has a close request (Step 1105), store a group with a close request attached as a group to be cut off (Step 1106).

Then, when processing of a group being currently processed is completed (Step 1107), take out a group at the top (Step 1108) and if the group is not the last group (Step 1109), add a close request to the last acquisition request of the group (step 1110). As a result, the server 70 cuts off a connection from its side upon completion of the reception of the data in question. Then, hand the name of the appropriate server 70 and the acquisition request over to the server side terminating unit 21 (Step 1111).

If the taken out group is the last group, because an additional data acquisition request might be further issued, hand the name of the appropriate server 70 and the acquisition request over to the server side terminating unit 21 without adding a close request (Step 1111).

When the processing of the group being currently processed is yet to be completed at Step 1107, unless the group being currently processed is the final group, store the classified group and the name of the server 70 to finish processing (Steps 1112 and 1113).

If the group being processed is the final group (Step 1112), when there exists other group than the first group of newly arriving acquisition requests, store the group together with the name of the corresponding server 70 (Step 1114) and when the group being currently processed and the first group of the newly arriving acquisition requests are bound for the same server 70 (Step 1115), add the first group of the newly arriving acquisition requests to the server side processing unit (Step 1116).

When the groups are bound for different servers 70, issue a connection cut-off request to the server side terminating unit 21a and upon completion of the cut-off, hand the first group of the newly arriving acquisition requests to the server side terminating unit 21a (Step 1117).

When at Step 1101, a processing completion notification of the currently processed group arrives from the server 70 (Step 1118), if the group is a group to be cut off, instruct the client side terminating unit 11a to cut off the connection with the client 60 (Steps 1119 and 1120).

Otherwise, if a group yet to be processed remains, proceed with the same processing as that conducted at the above-described Step 1108 and the following steps with respect to the group (Steps 1119 and 1121).

Figure 14:
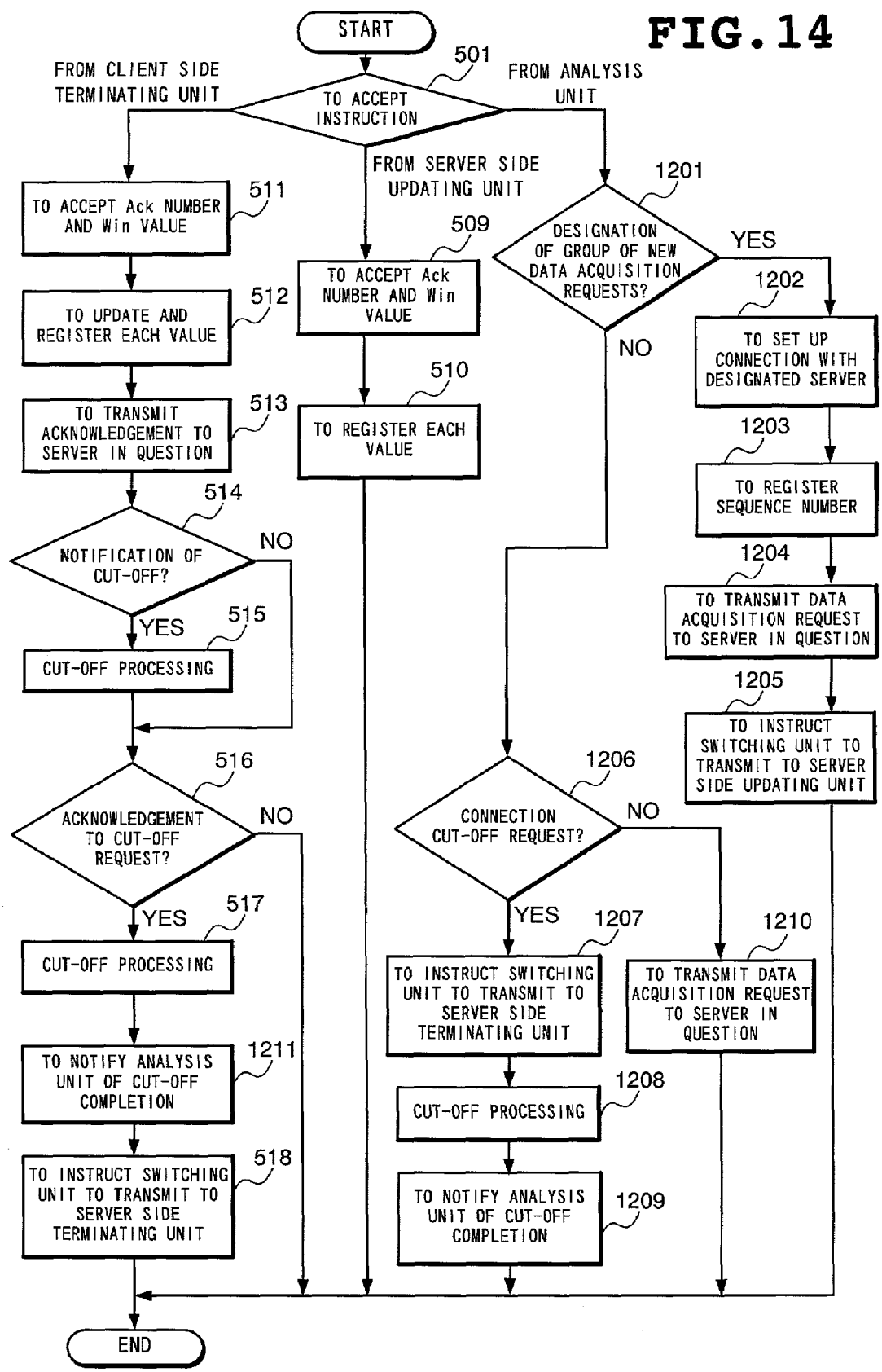
FIG. 14 is a flow chart for use in explaining operation of a server side terminating unit according to the second embodiment of the present invention.

FIG. 14 is a flow chart for use in explaining operation of the server side terminating unit 21a of the present embodiment.

With reference to FIG. 14, the differences of the server side terminating unit 21a of the present embodiment in operation from that of the first embodiment shown in FIG. 6 reside in operation conducted when receiving an instruction from the analysis unit 30a (Steps 1201 to 1210) and in including processing of notifying the analysis unit 30a of connection cut-off completion between Steps 517 and 518.

Description will be therefore made of operation to be conducted when receiving an instruction from the analysis unit 30a (Steps 1201 through 1210).

First, when accepting a group of new data acquisition requests (Step 1201), set up a connection of the transport layer with the server 70 according to the designation of a name of the server 70 as a connection destination received at the same time (Step 1202). At the time of setting up a connection, instruct the switching unit 23a in advance to conduct switching such that a packet arriving from the server 70 is received by the server side terminating unit 21a.

Upon setting-up of the connection, send the group of the data acquisition requests to the server 70 using the set up transport layer connection, as well as at the same time instructing the switching unit 23a to cause packets related to the connection in question coming from the server 70 hereafter to arrive at the server side updating unit 22a. Thus, using the set up transport layer connection, send the data acquisition requests to the server 70 (Steps 1203 through 1205).

When the accepted instruction is not designation of a new group at Step 1201, if it is a connection cut-off request (Step 1206), instruct the switching unit 23a to transmit the packet to the server side terminating unit (Step 1207) to cut off the connection (Step 1208) and notify the analysis unit 30a of the completion of the cut-off (Step 1209). On the other hand, when it is not a connection cut-off request at Step 1206, transmit the accepted data acquisition request to the corresponding server 70 (Step 1210).

Figure 15:
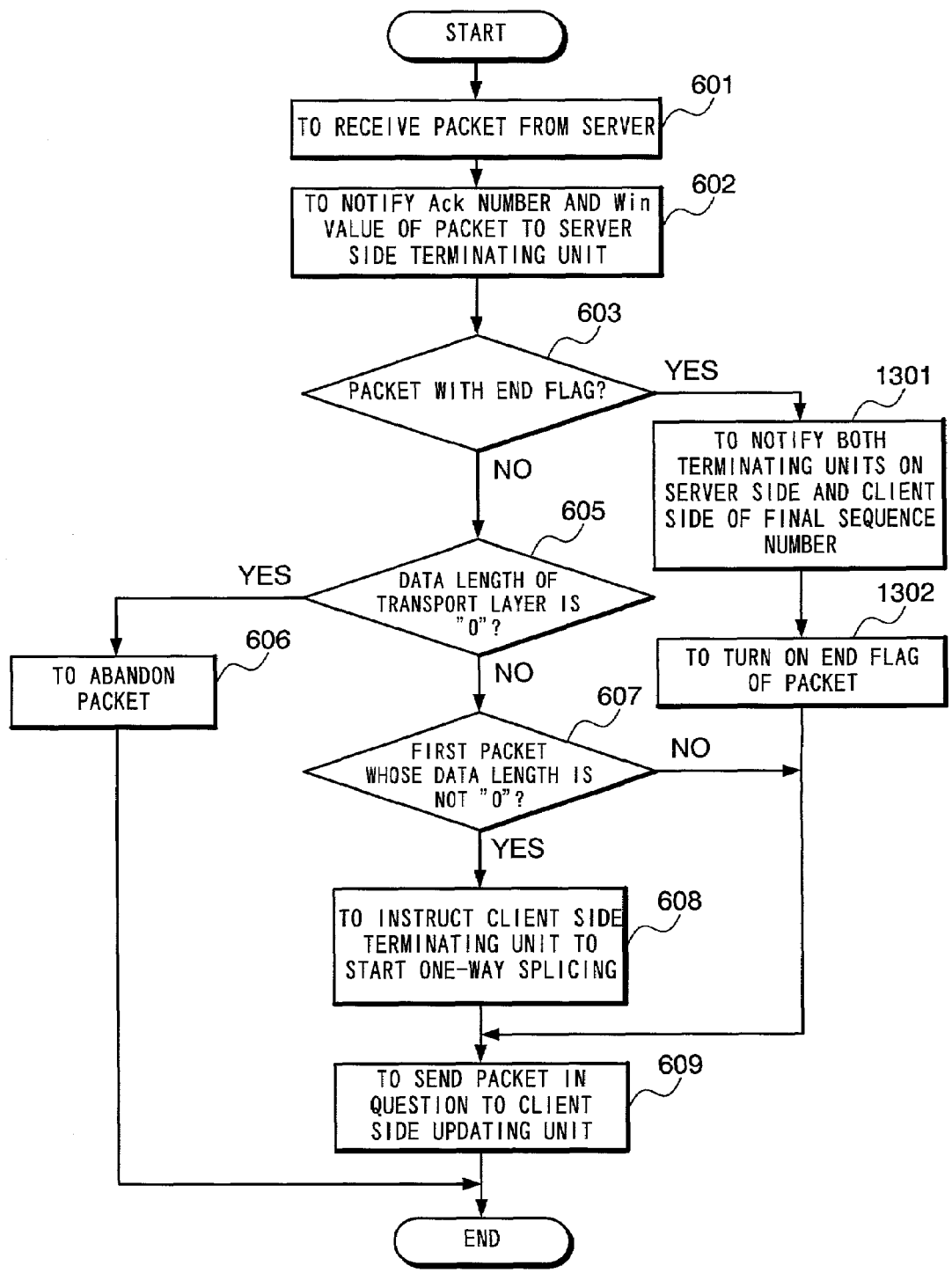
FIG. 15 is a flow chart for use in explaining operation of a server side updating unit according to the second embodiment of the present invention.

FIG. 15 is a flow chart for use in explaining operation of the server-side updating unit 22a of the present embodiment.

With reference to FIG. 15, the difference in operation of the server side updating unit 22a of the present invention from that of the first embodiment shown in FIG. 7 is the processing conducted when receiving a packet with an end flag from the server 70 at Step 603 (Steps 1301 and 1302).

Upon arrival of a packet with an end flag from the server 70, the server side updating unit 22a of the present embodiment hands the final sequence number "F" of data in the packet over to the server side terminating unit 21a and the client side terminating unit 11a (Step 1301), changes the end flag of the packet by turning "ON" (pulling down) (Step 1302) and hands the changed packet over to the client side updating unit 12a (Step 609).

Figure 16:
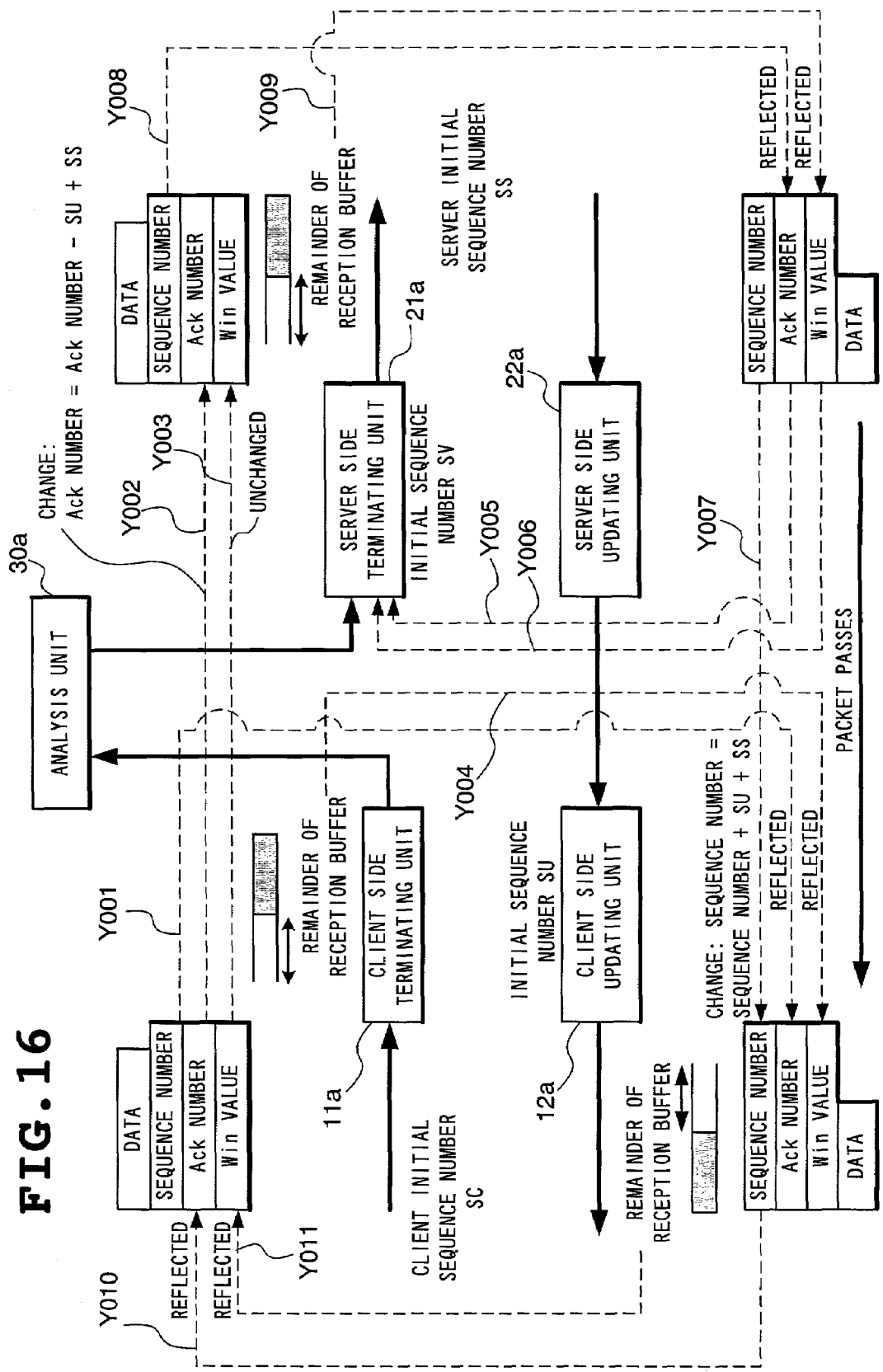
FIG. 16 is a diagram for use in explaining a flow of data in the one-way terminating switching apparatus according to the second embodiment of the present invention.

FIG. 16 is a diagram for use in explaining a flow of data in the one-way terminating switching apparatus of the present embodiment which shows how a sequence number, an Ack number and a Win value are sent and received among the client 60, the server 70, the client side terminating unit 11a, the server side terminating unit 21a, the client side updating unit 12a, the server side updating unit 22a and the like while one-way splicing operation is executed.

Also in the present embodiment, flows of data from the client 60 to the client side terminating unit 11a and an acknowledgement thereof, data from the server side terminating unit 21a to the server 70 and an acknowledgement thereof and data from the server 70 to the client 60 and an acknowledgement thereof, and a Win value indicative of a remainder of the reception buffer are properly processed in the same manner as that of the first embodiment of the present invention described with reference to FIG. 8.

Similarly to the description in the above first embodiment, another method can be adopted in which the client side terminating unit 11a and the server side terminating unit 21a of the present embodiment restore data, which is to be transmitted from the client 60 to the server 70 after being divided into individual packets, to an original state prior to division and then transmit the restored data to the server in question and when adopting this method, the analysis unit 30a of the present embodiment is allowed to conduct such processing of referring to transmission data restored to the original state prior to the division to determine a server as a connection destination or other processing.

The switching apparatus 100a of the present embodiment described in the foregoing has an effect, in addition to the effects produced by the first embodiment, of grouping data acquisition requests from the client 60 and allotting the same to appropriate servers 70 by the analysis unit 30a.

Moreover, completion of data transfer from the server 70 to the client 60 in response to each data acquisition request group can be detected to find an end of a sequence number of a packet having an end flag setting up which arrives from the server 70 in response to a close request issued to the server 70, whereby the servers 70 can be switched at appropriate timing.

Furthermore, by pulling down an end flag of a packet transmitted from the server 70 to the client 60, a connection between the client 60 and the one-way terminating switching apparatus 100a can be maintained without cut-off until the client 60 receives data corresponding to all the data acquisition requests.

Figure 17:
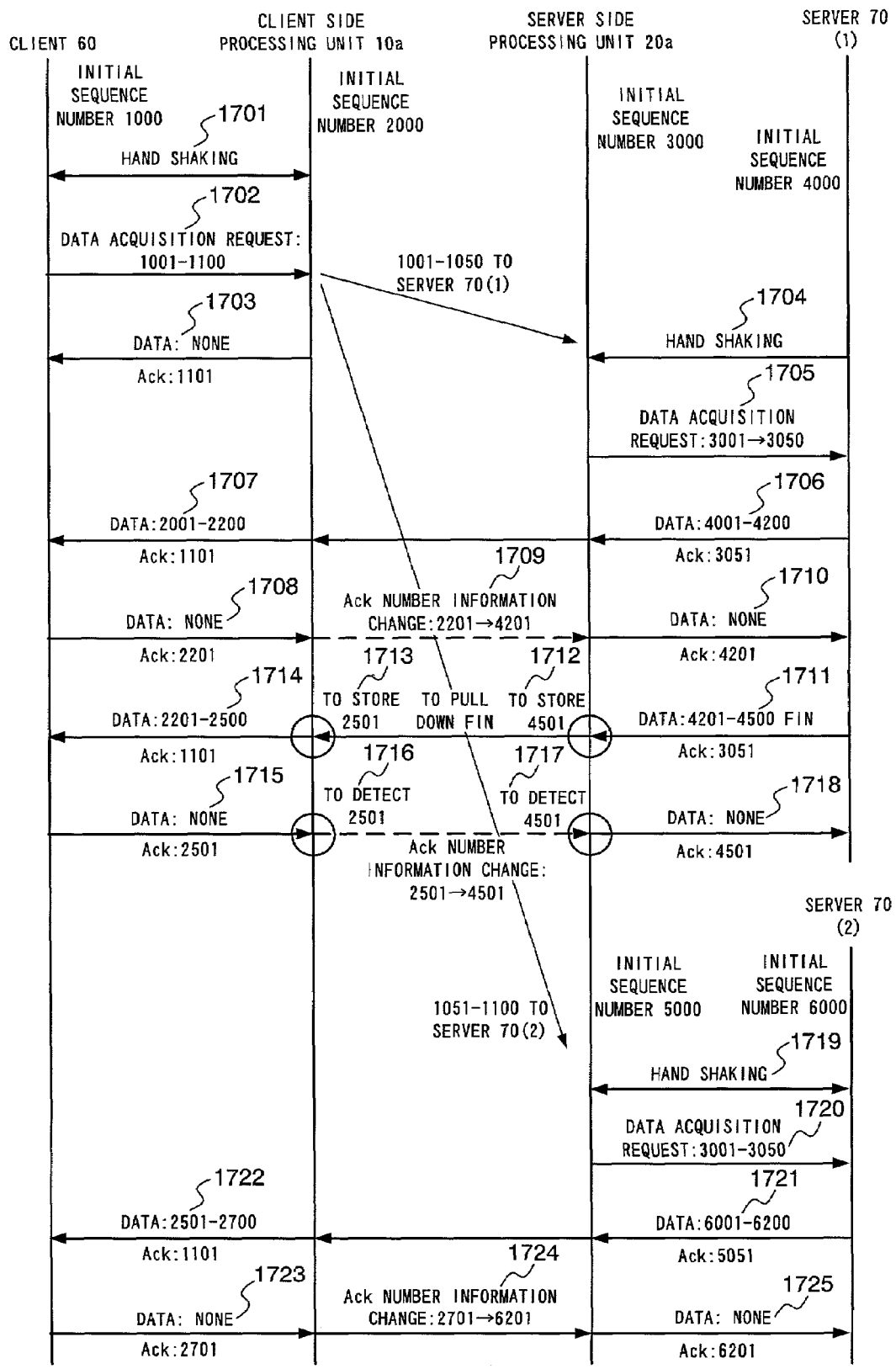
FIG. 17 is a timing chart for use in explaining a specific operation example of the second embodiment of the present invention.

Next, a specific example of operation at thus structured communication system according to the second embodiment will be described with reference to the timing chart of FIG. 17. FIG. 17 shows a time series of sequence numbers and Ack numbers in the second embodiment. Here, description will be made assuming that the first server 70 (1) and the second server 70 (2) exist as groups.

Hand shaking is conducted between the client 60 and the client side processing unit 10a. Here, assume that an initial sequence number of data on the side of the client 60 is "1000" and an initial sequence number of the client side processing unit 10a is "2000" (1701).

From the client 60, data mounted with data acquisition requests is transmitted to the client side processing unit 10a. At this time, sequence numbers of the data acquisition requests are assumed to be "1001" through "1100" (1702).

The client side processing unit 10a returns "1101" which is an Ack number corresponding the data acquisition request to the client 60 (1703).

The analysis unit 30 determines that among the received data acquisition requests (including a plurality of acquisition requests), some of the requests received at the beginning should be transmitted to the server 70 (1) and sets up a connection with the server 70(1). Assume that an initial sequence number of the server side processing unit 20a is "3000" and an initial sequence number of the server 70 (1) is "4000" (1704).

To the server 70(1), send the data acquisition requests to be transmitted (1705).

Part of data (sequence numbers "4001" through "4200") related to the requests is transmitted to the client 60 (1706).

With the sequence numbers and the Ack number rewritten, the requested data is delivered to the client 60. As a result of the number change, the sequence numbers are rewritten into "2001" through "2200" and the Ack number into "1101" (1707).

From the client 60, a packet with an Ack number indicative of the reception of data up to the sequence number "2200" is sent (1708).

The Ack number information is delivered to the server side processing unit 20a with its number changed (1709).

The server side processing unit 20a transmits a packet mounted with the changed Ack number to the server 70(1) (1710).

From the server 70(1), the last data (sequence numbers "4201" through "4500") corresponding to the requests is sent to the client 60. The packet has a FIN flag setting up (1711).

Store the Ack number "4501" corresponding to the last sequence number of the packet at the server side processing unit 20a. Pull down the Fin flag (1712).

At the client side processing unit 10a, the number "2501" obtained by changing the Ack number corresponding to the last sequence number of the packet is stored (1713).

With the sequence numbers and the Ack number changed, the requested data is delivered to the client 60. As a result of the number changes, the sequence numbers are rewritten into "2201" through "2500" and the Ack number into "1101". Here, because the packet has a Fin flag pulled down, the client 60 refrains from conducting connection end processing (1714).

The Ack number "2501" is returned from the client 60 (1715).

Watching the Ack number to find that it is coincident with the stored number "2501", the client side processing unit 10a finds that the client 60 has received the last data corresponding to the request from the server 70(1) (1716).

The server 70(1), because the number "4501" obtained by changing the Ack number of the packet coincides with the stored number, finds that the client 60 has received the last data corresponding to the requests from the server 70(1) to conduct end processing (1717).

To the server 70(1), a packet mounted with the changed Ack number is returned (1718).

The analysis unit 30a determines that among data acquisition requests from the client 60, some of subsequent requests (which had the sequence numbers "1051" through "1100" at the client side processing unit 10a) should be transmitted to the server 70 (2) to set up a connection with the server 70(2). Assume here that an initial sequence number of the server side processing unit 20a is "5000" and an initial sequence number of the server 70 (2) is "6000" (1719).

To the server 70(2), send the data acquisition requests to be transmitted (1720).

Part of data (sequence numbers "6001" through "6200") related to the requests is transmitted to the client 60 (1721).

With the sequence numbers and the Ack number rewritten, the requested data is delivered to the client 60. As a result of the number change, the sequence numbers are rewritten into "2501" through "2700" and the Ack number into "1101", (1722).

From the client 60, a packet with an Ack number indicative of the reception of data up to the sequence number "2700" is sent (1723).

The Ack number information is delivered to the server side processing unit 20a with its number changed (1724).

The server side processing unit 20*a* transmits a packet provided with the changed Ack number to the server 70(2) (1725).

As described above, by pulling down the end flag of the packet transmitted from the server 70(1) to the client 60, a connection between the client 60 and the one-way terminating switching apparatus 100*a* can be maintained without cut-off until the client 60 receives data related to all the data acquisition requests.

In the switching apparatuses 100 and 100*a* according to the above-described respective embodiments, the functions of the client side processing unit 10, the server side processing unit 20, the analysis unit 30 and the like and other functions can be realized not only as hardware but also by loading a computer program having the respective functions into a memory of a computer processing device. The computer program is stored in recording media 90 and 90*a* such as a magnetic disc and a semiconductor memory. Then, loading the program from the recording medium into the computer processing device to control operation of the computer processing device realizes the above-described functions.

The present invention can be also realized by running a switching program for the execution of packet communication between a server and a client through a switching apparatus on the server 70 under the control of a computer on the server 70. The switching program is similarly stored in a recording medium of the server 70 to that described above. More specifically, the switching program operates such that from the time of relaying of a data acquisition request from the client 60 by the switching apparatus 100 until the end of transmission of an acknowledgement packet to be sent to the client 60, a packet is transmitted to the client 60 in question by one-way splicing.

The present invention can be further realized by running a switching program for conducting packet communication between the server 70 and the client 60 through the switching apparatus 100 on the client 60 under the control of a computer of the client 60. The switching program is similarly stored in a recording medium of the client 60 to that described above. More specifically, the switching program operates such that from the time of relaying of a data acquisition request to the server 70 by the switching apparatus 100 until the end of transmission of an acknowledgement packet received from the server 70, a packet is received from the server 70 in question by one-way splicing.

Although the present invention has been described in the foregoing with respect to the preferred modes and embodiments, it should be understood that the present invention is not necessarily limited to the above-described modes and embodiments but is realized as modifications within a scope of its technical idea.

As described in the foregoing, the one-way terminating switching apparatus of the present invention attain such effects as follows.

First, the one-way terminating switching apparatus of the present invention realizes high-speed packet transfer by transferring each packet from a server to a client with its data rewritten in a sequence number, an Ack number and a Win value during one-way splicing without terminating a transport layer, as well as realizing one-way splicing in which a data acquisition request sent from the client to the server can be referred to terminate.

Referring to a data acquisition request transmitted from a client to a server by one-way splicing enables data acquisition requests to be transferred to appropriate servers all the time, while as to a large volume of data arriving from the server to the side of the client, simplified terminating processing involving only the rewriting of a sequence number and an Ack number of each packet realizes a throughput equivalent to that of the conventional switching apparatus 100*b*.

Moreover, until a client receives all the data related to a data acquisition request from the client, a connection set up between the client and the one-way terminating switching apparatus can be maintained without cut-off, thereby eliminating the need of further set-up of a connection between the client and the one-way switching apparatus to minimize a delay in obtaining necessary data.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication system using packet switching for conducting packet communication between a server and a client through a switching apparatus, wherein
    during relay of a packet to be transmitted from said server to said client, said switching apparatus rewrites header information of the packet to have the contents which are to be set when the packet is sent from said switching apparatus and sends said packet to said client, and
    from the time of relay of a data acquisition request from said client until the end of transmission of an acknowledgement packet from said server to said client, said switching apparatus conducts a one-way splicing processing in the direction from the server to the client, whereby retransmission control and flow control of communication are successively conducted in the direction from said client to said server, and not conducted in the direction from the server to the client,
    wherein said switching apparatus comprises:
    a client side processing unit for accepting a connection from said client to manage a connection with the client for transmitting and receiving a packet to and from the client, said client side processing unit comprising:
    a client side terminating unit for controlling a connection with said client to accept a connection and a request from said client, and
    a client side updating unit for rewriting the header information of a packet to be transmitted from said server to said client to relay the rewritten packet, and
    a server side processing unit for accessing said server to manage a connection with the server for transmitting and receiving a packet to and from the server, said server side processing unit comprising:
    a server side terminating unit for managing a connection with said server to relay an instruction and data directed to said server which are sent from said client side terminating unit, and
    a server side updating unit for accepting a packet to be transmitted from said server to said client to send the packet to said client side updating unit.

2. The communication system as set forth in claim 1, wherein the header information of said packet comprises:
    a sequence number indicative of, in transmission data divided into individual packets, order of data in the packet, a data length of the packet, and an Ack number indicative of a sequence number of data that a communication partner has already received.

3. The communication system as set forth in claim 2, wherein the header information of said packet further comprises a Win value indicative of a remaining capacity of a reception buffer that the communication partner is yet to receive.

4. The communication system as set forth in claim 1, wherein said client side terminating unit comprises means for notifying said client side updating unit and said server side terminating unit of header information of a packet received from said client, and said server side updating unit comprises means for notifying said server side terminating unit of header information of a packet to be transmitted from said server to said client, said client side updating unit and said server side terminating unit records and refers to said notified header information to properly rewrite header information of the packet.

5. The communication system as set forth in claim 4, wherein at a state where said one-way splicing processing is set, said client side terminating unit instructs said client side updating unit to conduct acknowledgment processing in response to a packet received from said client, and said client side updating unit comprises means for receiving an instruction of said acknowledgement processing to generate and send an acknowledgement packet to the client.

6. The communication system as set forth in claim 1, wherein said server side updating unit relays transmission of packets from a plurality of servers directed to said client, and comprises means for removing, from header information of at least one of the packets to be relayed, a flag indicative of the end of transmission of the at least one of the packets at one of the plurality of servers, thereby relaying a packet transmitted by the switching of said plurality of servers to said client without cut-off of a connection with said client.

7. The communication system as set forth in claim 1, wherein said client side terminating unit and said server side terminating unit comprise means for restoring transmission data to be transmitted in individual divided packets from said client to said server to an original state prior to dividing the transmission data so as to selectively transmit each packet to the server.

8. The communication system as set forth in claim 1, further comprising an analysis unit for determining a corresponding server as a connection destination to which said client connects, said analysis unit comprising:

means for obtaining, from said client side terminating unit, information of a request sent by said client to said server, means for determining the corresponding server as a connection destination to which the client is to connect based on said request, and means for instructing said server side terminating unit to connect the client with said corresponding server determined as a connection destination.

9. The communication system as set forth in claim 8, wherein said client side terminating unit and said server side terminating unit comprise means for restoring transmission data to be transmitted in individual divided packets from said client to said server to an original state prior to dividing the transmission data and then transmitting the restored packet to the server, and said analysis unit comprises means for determining said corresponding server as a connection destination based on said transmission data restored to the original state prior to dividing the transmission data.

10. The communication system as set forth in claim 8, wherein said analysis unit further comprises:

means for sequentially classifying data acquisition requests yet to be processed which are issued by said client into groups according to corresponding servers as connection destinations, and means for instructing, based on each of said classified groups, said server side terminating unit to set up a connection to a corresponding server and execute said data acquisition requests classified into the groups.

11. The communication system as set forth in claim 8, wherein said analysis unit further comprises:

means for sequentially classifying data acquisition requests yet to be processed which are issued by said client into groups according to corresponding servers as connection destinations, and means for instructing, based on each of said classified groups, said server side terminating unit to set up a connection to a corresponding server, execute said data acquisition requests classified into the groups and cut off the connection with the corresponding server after the transmission of the acquisition request.

12. A switching apparatus for relaying packet communication through a communication network between a plurality of servers and clients, wherein during relay of a packet to be transmitted from one of the plurality of servers to one of the plurality of clients, said switching apparatus rewrites header information of the packet to have the contents which are to be set when the packet is sent from the switching apparatus and sends said packet to said client, and from the time of relay of a data acquisition request from said client until the end of transmission of an acknowledgement packet to be transmitted from said server to said client, said switching apparatus conducts one-way splicing processing in the direction from the server to the client, as well as successively conducts retransmission control and flow control of communication in the direction from said client to said server, the switching apparatus comprising:

a client side processing unit for accepting a connection from said client to manage a connection with the client for transmitting and receiving a packet to and from the client, a server side processing unit for accessing said server to manage a connection with the server for transmitting and receiving a packet to and from the server, means for, during relay of a packet to be transmitted from said server to said client, rewriting header information of said packet to send said packet rewritten to said client, and means for conducting one-way splicing in the direction from said server to the client, as well as successively conducting retransmission control and flow control for communication in the direction from said client to said client side processing unit and communication in the direction from said server side processing unit to said server without cutting off an established connection, and wherein said client side processing unit comprises:
a client side terminating unit for managing a connection with each of the plurality of clients to accept a connection and a request therefrom, and
a client side updating unit for rewriting header information of a packet to be transmitted from said server to said client to relay the rewritten packet, and
wherein said server side processing unit comprises:
a server side terminating unit for managing a connection with each of the plurality of servers to relay an instruction and data directed to each said plurality of servers which are sent from said client side terminating unit, and
a server side updating unit for accepting a packet to be transmitted from each of the plurality of servers to each of the plurality of clients to send the packet to said client side updating unit.

13. The switching apparatus as set forth in claim 12, wherein the header information of said packet comprises:
a sequence number indicative of, in transmission data divided into individual packets, order of data in the packet,
a data length of the packet, and
an Ack number indicative of a sequence number of data that a communication partner has already received.

14. The switching apparatus as set forth in claim 13, wherein the header information of said packet further comprises a Win value indicative of a remaining capacity of a reception buffer that the communication partner is yet to receive.

15. The switching apparatus as set forth in claim 12, wherein
said client side terminating unit comprises means for notifying said client side updating unit and said server side terminating unit of header information of a packet received from each said client, and
said server side updating unit comprises means for notifying said server side terminating unit of header information of a packet to be transmitted from said server to said client,
said client side updating unit and said server side terminating unit record and refer to said notified header information to properly rewrite the header information of the packet.

16. The switching apparatus as set forth in claim 15, wherein
at a state where said one-way splicing processing is set, said client side terminating unit instructs said client side updating unit to conduct acknowledgment processing in response to a packet received from said client, and
said client side updating unit comprises means for accepting an instruction of said acknowledgement processing to generate and send an acknowledgement packet to the client.

17. The switching apparatus as set forth in claim 12, wherein said server side updating unit
relays transmission of packets from a plurality of said servers directed to said client, and
comprises means for removing, from header information of a packet to be relayed, a flag indicative of the end of transmission of the packet at each of said plurality of the servers,
thereby relaying a packet transmitted by the switching of said plurality of the servers to said client without cut-off of a connection with said client.

18. The switching apparatus as set forth in claim 12, wherein said client side terminating unit and said server side terminating unit comprise means for restoring transmission data to be transmitted in individual divided packets from said client to said server to an original state prior to dividing the transmission data so as to selectively transmit each packet to the server.

19. The switching apparatus as set forth in claim 12, further comprising an analysis unit for determining a corresponding server as a connection destination to which said client connects, wherein said analysis unit comprises:
means for obtaining, from said client side terminating unit, information of a request sent by said client to said server,
means for determining the corresponding server as a connection destination to which the client is to connect based on said request, and
means for instructing said server side terminating unit to connect the client with said corresponding server determined as a connection destination.

20. The switching apparatus as set forth in claim 19, wherein
said client side terminating unit and said server side terminating unit comprise means for restoring transmission data to be transmitted in individual divided packets from said client to said server to an original state prior to dividing the transmission data and then transmitting the restored packet to the server, and
said analysis unit comprises means for determining said corresponding server as a connection destination based on said transmission data restored to the original state prior to dividing the transmission data.

21. The switching apparatus as set forth in claim 19, wherein said analysis unit comprises:
means for sequentially classifying data acquisition requests yet to be processed which are issued by said client into groups according to corresponding servers as connection destinations, and
means for instructing, based on each of said classified groups, said server side terminating unit to set up a connection to a corresponding server and execute said data acquisition requests classified into the groups.

22. A packet switching method of a switching apparatus for relaying packet communication through a communication network between a plurality of servers and clients, the method comprising:
during relay of a packet to be transmitted from one of the plurality of servers to one of the plurality of clients, rewriting header information of the packet to have the contents which are to be set when the packet is sent from the switching apparatus and sending said packet to said client, and
from the time of relay of a data acquisition request from said client until the end of transmission of an acknowledgement packet to be transmitted from said server to said client, conducting one-way splicing processing in the direction from the server to the client, as well as successively conducting retransmission control and flow control of communication in the direction from said client to said server,
managing a connection with said client to accept a connection and a request from said client,
rewriting header information of a packet to be transmitted from said server to said client to relay the rewritten packet, and
managing a connection with said server to relay an instruction and data directed to said server and sent from said client, wherein the header information of said packet comprises:
a sequence number indicative of, in transmission data divided into individual packets, order of data in the packet,
a data length in and below a transport layer of the packet,
an Ack number indicative of a sequence number of data that a communication partner has already received, and
a Win value indicative of a remaining capacity of a reception buffer that the communication partner is yet to receive.

23. The packet switching method as set forth in claim 22, further comprising:
relaying transmission of packets from a plurality of said servers directed to one of said clients, and
removing, from header information of at least one of the packets to be relayed, a flag indicative of the end of transmission of the at least one of the packets at one of the plurality of said servers,
thereby relaying a packet transmitted by the switching of said plurality of the servers to said client without cut-off of a connection with said client.

24. The packet switching method as set forth in claim 22, further comprising restoring transmission data to be transmitted in individual divided packets from said client to said server to an original state prior to dividing the transmission data so as to selectively transmit each packet to the server.

25. The packet switching method as set forth in claim 22, further comprising:
obtaining information of a request to be transmitted by said client to said server,
determining a corresponding server as a connection destination to which the client is to connect based on said request, and
giving an instruction to connect the client with said corresponding server determined as a connection destination,
thereby determining a corresponding server as a connection destination to which said client is to connect.

26. The packet switching method as set forth in claim 25, further comprising:
sequentially classifying data acquisition requests yet to be processed which are issued by said client into groups according to corresponding servers as connection destinations, and
giving an instruction, based on each of said classified groups, to set up a connection to each of the corresponding servers and execute said data acquisition requests classified into the groups.

27. A computer-readable medium storing a switching program for relaying packet communication through a communication network between a plurality of servers and clients the program being being executed by a computer to:
during relay of a packet to be transmitted from one of said servers to one of said clients, rewrite header information of the packet to have the contents which are to be set when the packet is sent from a switching apparatus and sending said packet to said client, and
from the time of relay of a data acquisition request from said client until the end of transmission of an acknowledgement packet to be transmitted from said server to said client, conduct one-way splicing processing in the direction from the server to the client, as well as successively conduct retransmission control and flow control of communication in the direction from said client to said server,
manage a connection with said client to accept a connection and a request from said client,
rewrite header information of a packet to be transmitted from said server to said client to relay the rewritten packet, and
manage a connection with said server to relay an instruction and data directed to said server which are sent from said client,
wherein the header information of said packet comprises:
a sequence number indicative of, in transmission data divided into individual packets, order of data in the packet,
a data length in and below a transport layer of the packet,
an Ack number indicative of a sequence number of data that a communication partner has already received,
a Win value indicative of a remaining capacity of a reception buffer that the communication partner is yet to receive,
relay transmission of packets from a plurality of said servers directed to one of said clients, and
remove, from header information of a packet to be relayed, a flag indicative of the end of transmission of the packet at each of the plurality of said servers,
thereby relaying a packet transmitted by the switching of said plurality of the servers to said one of the clients without cut-off of a connection with said one of the clients.

28. The computer-readable medium storing a switching program as set forth in claim 27, wherein the program being executed by a computer to restore transmission data to be transmitted in individual divided packets from said client to said server to an original state prior to dividing the transmission data so as to selectively transmit each packet to the server.

29. The computer-readable medium storing a switching program as set forth in claim 27, wherein the program being executed by a computer to:
obtain information of a request to be transmitted by said client to said server,
determine a corresponding server as a connection destination to which the client connects based on said request, and
give an instruction to connect the client with said server determined as a connection destination,
thereby determining the corresponding server as a connection destination to which said client is to connect.

30. The computer-readable medium storing a switching program as set forth in claim 29, wherein the program being executed by a computer to:
sequentially classify data acquisition requests yet to be processed which are issued by said client into groups according to corresponding servers as connection destinations, and
give an instruction, based on each of said classified groups, to set up a connection to a corresponding server and execute said data acquisition requests classified into the groups.

31. A server in a communication system for conducting packet communication between a server and a client through a switching apparatus, wherein
from the time of relay of a data acquisition request from said client by said switching apparatus until the end of transmission of an acknowledgement packet to be transmitted to said client, said server transmits said packet to the client by one-way splicing,
wherein to said client, said server transmits said packet with header information rewritten to have the contents to be set when the packet is transmitted from said switching apparatus, wherein the header information of said packet comprises:
a sequence number indicative of, in transmission data divided into individual packets, order of data in the packet,
a data length of the packet, and
an Ack number indicative of a sequence number of data that a communication partner has already received, and
wherein the header information of said packet further comprises a Win value indicative of a remaining capacity of a reception buffer that the communication partner is yet to receive.

32. The server as set forth in claim 31, wherein
said switching apparatus relays transmission of packets from a plurality of servers directed to one client, and
from header information of a packet to be relayed, a flag is removed which is indicative of the end of transmission of the packet at each of the plurality of servers,
thereby relaying a packet transmitted by the switching of said plurality of servers to said client without cut-off of a connection with said client.

33. The server as set forth in claim 31, wherein the transmission data to be transmitted in individual divided packets from said client is restored to an original state, whereby each packet restored is received by a selected server.

34. The server as set forth in claim 31, wherein
a corresponding server as a connection destination to which said client is to connect is determined by said switching apparatus,
information of a request to be transmitted by said client to said corresponding server is obtained by said switching apparatus,
a server as a connection destination to which the client is to connect is determined based on said request, and
an instruction to connect the client with said corresponding server determined as a connection destination is given.

35. The server as set forth in claim 34, wherein
data acquisition requests yet to be processed which are issued by said client are sequentially classified into groups as set forth in corresponding servers as connection destinations, and
based on each of said classified groups, an instruction is given to set up a connection to a corresponding server and execute said data acquisition requests classified into the groups.

36. A client in a communication system which conducts packet communication between a server and a client through a switching apparatus, wherein
from the time of relay of a data acquisition request to said server by said switching apparatus until the end of transmission of an acknowledgement packet to be received from said server, said client receives said packet from the server by one-way splicing,
wherein said client receives from said server, said packet with header information rewritten to have the contents to be set when the packet is transmitted from said switching apparatus, and
wherein the header information of said packet comprises:
a sequence number indicative of, in transmission data divided into individual packets, order of data in the packet,
a data length of the packet, and
an Ack number indicative of a sequence number of data that a communication partner has already received, and
a Win value indicative of a remaining capacity of a reception buffer that the communication partner is yet to receive.

37. The client as set forth in claim 36, wherein
said switching apparatus relays transmission of packets from a plurality of servers directed to one client, and
from header information of a packet to be relayed, a flag is removed which is indicative of the end of transmission of the packet at each of the plurality of servers,
thereby relaying a packet transmitted by the switching of said plurality of servers to said client without cut-off of a connection with said client.

38. The client as set forth in claim 36, wherein the transmission data to be transmitted in individual divided packets from said client is restored to an original state prior to dividing the transmission data and each packet restored is transmitted to a selected server.

39. The client as set forth in claim 36, wherein
a corresponding server as a connection destination to which said client is to connect is determined by said switching apparatus,
information of a request to be transmitted by said client to said server is obtained by said switching apparatus,
the corresponding server as a connection destination to which the client is to connect is determined based on said request, and
an instruction to connect the client with said corresponding server determined as a connection destination is given.

40. The client as set forth in claim 39, wherein
data acquisition requests yet to be processed which are issued by said client are sequentially classified into groups according to corresponding servers as connection destinations, and
based on each of said classified groups, an instruction is given to set up a connection to a corresponding server and execute said data acquisition requests classified into the groups.

* * * * *